(12) United States Patent
Wakimoto et al.

(10) Patent No.: US 9,454,941 B2
(45) Date of Patent: Sep. 27, 2016

(54) METHOD FOR DRIVING DISPLAY DEVICE

(71) Applicant: Semiconductor Energy Laboratory Co., Ltd., Atsugi-shi, Kanagawa-ken (JP)

(72) Inventors: Kenichi Wakimoto, Atsugi (JP); Yasuo Nakamura, Machida (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/635,185

(22) Filed: Mar. 2, 2015

(65) Prior Publication Data

US 2015/0179119 A1 Jun. 25, 2015

Related U.S. Application Data

(63) Continuation of application No. 13/005,558, filed on Jan. 13, 2011, now Pat. No. 9,105,251.

(30) Foreign Application Priority Data

Jan. 20, 2010 (JP) ................. 2010-010321

(51) Int. Cl.
*G09G 3/36* (2006.01)

(52) U.S. Cl.
CPC .... *G09G 3/3648* (2013.01); *G09G 2320/0261* (2013.01); *G09G 2320/103* (2013.01); *G09G 2330/026* (2013.01)

(58) Field of Classification Search
CPC ............... G09G 2320/103; G09G 3/3648; G09G 3/3688
USPC .............. 345/87–100, 211–213, 690
See application file for complete search history.

(56) References Cited

U.S. PATENT DOCUMENTS

| | | |
|---|---|---|
| 5,155,613 A | 10/1992 | Sakayori |
| 5,534,884 A | 7/1996 | Mase et al. |
| 5,731,856 A | 3/1998 | Kim et al. |

(Continued)

FOREIGN PATENT DOCUMENTS

| | | | |
|---|---|---|---|
| EP | 1391871 A | 2/2004 | |
| EP | 1724751 A | 11/2006 | |

(Continued)

OTHER PUBLICATIONS

Taiwanese Office Action (Application No. 100100482) Dated Jun. 10, 2015.

(Continued)

*Primary Examiner* — Jennifer Nguyen
(74) *Attorney, Agent, or Firm* — Robinson Intellectual Property Law Office; Eric J. Robinson

(57) ABSTRACT

An object is to provide a convenient display device which consumes sufficiently small amount of power and a method for driving such a display device. The display device can be in an off state with a still image displayed in a still image display mode in which a pixel electrode and a common electrode which are for applying a voltage to the display element are brought into a floating state so that a voltage applied to the display element is held, and a still image is displayed without further supply of a potential. The display device is put to an off state with a desired image displayed in the still image display mode, whereby the display device can have a higher level of security and can be more convenient.

14 Claims, 10 Drawing Sheets

(56) References Cited

U.S. PATENT DOCUMENTS

| | | |
|---|---|---|
| 5,744,864 A | 4/1998 | Cillessen et al. |
| 5,767,832 A | 6/1998 | Koyama et al. |
| 5,982,471 A | 11/1999 | Hirakata et al. |
| 6,169,532 B1 | 1/2001 | Sumi et al. |
| 6,225,969 B1 | 5/2001 | Ishii |
| 6,266,038 B1 | 7/2001 | Yoshida et al. |
| 6,294,274 B1 | 9/2001 | Kawazoe et al. |
| 6,480,181 B2 | 11/2002 | Ishii |
| 6,563,174 B2 | 5/2003 | Kawasaki et al. |
| 6,727,522 B1 | 4/2004 | Kawasaki et al. |
| 6,803,898 B2 | 10/2004 | Ishii |
| 6,897,843 B2 | 5/2005 | Ayres et al. |
| 6,961,042 B2 | 11/2005 | Murai |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,098,880 B2 | 8/2006 | Inoue et al. |
| 7,105,868 B2 | 9/2006 | Nause et al. |
| 7,211,825 B2 | 5/2007 | Shih et al. |
| 7,212,185 B2 | 5/2007 | Yanagi et al. |
| 7,282,782 B2 | 10/2007 | Hoffman et al. |
| 7,286,108 B2 | 10/2007 | Tsuda et al. |
| 7,297,977 B2 | 11/2007 | Hoffman et al. |
| 7,321,353 B2 | 1/2008 | Tsuda et al. |
| 7,323,356 B2 | 1/2008 | Hosono et al. |
| 7,362,295 B2 | 4/2008 | Park et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,598,520 B2 | 10/2009 | Hirao et al. |
| 7,601,984 B2 | 10/2009 | Sano et al. |
| 7,674,650 B2 | 3/2010 | Akimoto et al. |
| 7,732,819 B2 | 6/2010 | Akimoto et al. |
| 7,737,517 B2 | 6/2010 | Kawamura et al. |
| 7,791,072 B2 | 9/2010 | Kumomi et al. |
| 7,791,074 B2 | 9/2010 | Iwasaki |
| 7,800,318 B2 | 9/2010 | Hsu |
| 7,907,111 B2 | 3/2011 | Fujita |
| 7,993,964 B2 | 8/2011 | Hirao et al. |
| 8,067,775 B2 | 11/2011 | Miyairi et al. |
| 8,436,799 B2 | 5/2013 | Credelle |
| 8,599,177 B2 | 12/2013 | Koyama et al. |
| 8,922,537 B2 | 12/2014 | Koyama et al. |
| 9,105,251 B2 * | 8/2015 | Wakimoto ............ G09G 3/3648 345/102 |
| 9,214,121 B2 * | 12/2015 | Toyotaka ............. G09G 3/3648 |
| 9,251,748 B2 | 2/2016 | Koyama et al. |
| 2001/0015710 A1 | 8/2001 | Hirakata |
| 2001/0020928 A1 | 9/2001 | Yanagisawa et al. |
| 2001/0024187 A1 * | 9/2001 | Sato ..................... G09G 3/3659 345/98 |
| 2001/0046027 A1 | 11/2001 | Tai et al. |
| 2002/0003271 A1 | 1/2002 | Ikeda et al. |
| 2002/0056838 A1 | 5/2002 | Ogawa |
| 2002/0060673 A1 | 5/2002 | Noritake et al. |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2004/0179002 A1 | 9/2004 | Park et al. |
| 2004/0246280 A1 | 12/2004 | Credelle et al. |
| 2005/0017302 A1 | 1/2005 | Hoffman |
| 2005/0199959 A1 | 9/2005 | Chiang et al. |
| 2005/0219188 A1 | 10/2005 | Kawabe et al. |
| 2005/0253829 A1 * | 11/2005 | Mamba ................ G09G 3/3614 345/204 |
| 2006/0007217 A1 | 1/2006 | Kanbe et al. |
| 2006/0022932 A1 | 2/2006 | Sagawa et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0262066 A1 | 11/2006 | Yamazaki et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0072439 A1 | 3/2007 | Akimoto et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0205976 A1 | 9/2007 | Takatori et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0042968 A1 | 2/2008 | Oh |
| 2008/0050595 A1 | 2/2008 | Nakagawara et al. |
| 2008/0055218 A1 | 3/2008 | Tsuda et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0198107 A1 | 8/2008 | Park et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0284970 A1 | 11/2008 | Ishitani |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0079684 A1 | 3/2009 | Watanabe |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0213104 A1 | 8/2009 | Yaguma et al. |
| 2009/0237348 A1 | 9/2009 | Kitamura |
| 2009/0261325 A1 | 10/2009 | Kawamura et al. |
| 2009/0278122 A1 | 11/2009 | Hosono et al. |
| 2009/0280600 A1 | 11/2009 | Hosono et al. |
| 2010/0025678 A1 | 2/2010 | Yamazaki et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0244020 A1 | 9/2010 | Sakata et al. |
| 2011/0090183 A1 | 4/2011 | Yamazaki et al. |
| 2011/0090204 A1 | 4/2011 | Yamazaki et al. |
| 2011/0090207 A1 | 4/2011 | Yamazaki et al. |

(56) References Cited

U.S. PATENT DOCUMENTS

| | | |
|---|---|---|
| 2011/0102696 A1 | 5/2011 | Yamazaki et al. |
| 2011/0115839 A1 | 5/2011 | Takahashi et al. |
| 2011/0128461 A1 | 6/2011 | Koyama et al. |
| 2011/0134350 A1 | 6/2011 | Yamazaki et al. |
| 2011/0148826 A1 | 6/2011 | Koyama et al. |
| 2011/0148846 A1 | 6/2011 | Arasawa et al. |
| 2012/0061668 A1 | 3/2012 | Miyairi et al. |
| 2015/0293420 A1 | 10/2015 | Toyotaka et al. |

FOREIGN PATENT DOCUMENTS

| | | |
|---|---|---|
| EP | 1737044 A | 12/2006 |
| EP | 2226847 A | 9/2010 |
| EP | 2309485 A | 4/2011 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-224626 A | 9/1993 |
| JP | 05-251705 A | 9/1993 |
| JP | 07-333577 A | 12/1995 |
| JP | 08-264794 A | 10/1996 |
| JP | 09-090317 A | 4/1997 |
| JP | 11-505377 | 5/1999 |
| JP | 2000-044236 A | 2/2000 |
| JP | 2000-150900 A | 5/2000 |
| JP | 2000-267066 A | 9/2000 |
| JP | 2001-290170 A | 10/2001 |
| JP | 2001-312253 A | 11/2001 |
| JP | 2002-076356 A | 3/2002 |
| JP | 2002-132202 A | 5/2002 |
| JP | 2002-169499 A | 6/2002 |
| JP | 2002-289859 A | 10/2002 |
| JP | 2003-086000 A | 3/2003 |
| JP | 2003-086808 A | 3/2003 |
| JP | 2003-131633 A | 5/2003 |
| JP | 2004-078124 A | 3/2004 |
| JP | 2004-103957 A | 4/2004 |
| JP | 2004-272270 A | 9/2004 |
| JP | 2004-273614 A | 9/2004 |
| JP | 2004-273732 A | 9/2004 |
| JP | 2005-300948 A | 10/2005 |
| JP | 2006-165527 A | 6/2006 |
| JP | 2006-165528 A | 6/2006 |
| JP | 2006-350318 A | 12/2006 |
| JP | 2007-096055 A | 4/2007 |
| JP | 2007-123861 A | 5/2007 |
| JP | 2008-083211 A | 4/2008 |
| JP | 2009-042263 A | 2/2009 |
| JP | 2009-186542 A | 8/2009 |
| JP | 2009-528670 | 8/2009 |
| JP | 5031086 | 9/2012 |
| TW | 578120 | 3/2004 |
| TW | 200728849 | 8/2007 |
| WO | WO-03/009268 | 1/2003 |
| WO | WO-2004/114391 | 12/2004 |
| WO | WO-2007/142167 | 12/2007 |
| WO | WO-2011/074393 | 6/2011 |

OTHER PUBLICATIONS

Tsuda.K et al., "Ultra Low Power Consumption Technologies for Mobile TFT-LCDs", IDW '02 : Proceedings of the 9th International Display Workshops, Dec. 4, 2002, pp. 295-298.

International Search Report (Application No. PCT/JP2010/073852) Dated Apr. 19, 2011.

Written Opinion (Application No. PCT/JP2010/073852) Dated Apr. 19, 2011.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Kimizuka.N et al., "Spinel,YBFe2O4, and YB2Fe3O7 Types of Structures for Compounds in the IN2O3 and SC2O3—A2O3—BO Systems [A; Fe, Ga, or Al; B: Mg, Mn, Fe, Ni, Cu, or Zn] at Temperatures over 1000° C.", Journal of Solid State Chemistry, 1985, vol. 60, pp. 382-384.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Kitzerow.H et al., "Observation of Blue Phases in Chiral Networks", Liquid Crystals, 1993, vol. 14, No. 3, pp. 911-916.

Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Kikuchi.H et al., "Polymer-Stabilized Liquid Crystal Blue Phases", Nature Materials, Sep. 2, 2002, vol. 1, pp. 64-68.

Nomura.K et al., "Thin-Film Transistor Fabricated in Single-Crystalline Transparent Oxide Semiconductor", Science, May 23, 2003, vol. 300, No. 5623, pp. 1269-1272.

Ikeda.T et al., "Full-Functional System Liquid Crystal Display Using Cg-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Lee.H et al., "Current Status of, Challenges to, and Perspective View of AM-OLED", IDW '06 : Proceedings of the 13th International Display Workshops, Dec. 7, 2006, pp. 663-666.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hirao. T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17-22.

Park.S et al., "Challenge to Future Displays: Transparent AM-OLED Driven by Peald Grown ZnO TFT", IMID '07 Digest, 2007, pp. 1249-1252.

Kikuchi.H et al., "62.2:Invited Paper:Fast Electro-Optical Switching in Polymer-Stabilized Liquid Crystalline Blue Phase for Display Application", SID Digest '07 : SID International Symposium Digest of Technical Papers, 2007, vol. 38, pp. 1737-1740.

Miyasaka.M, "SUFTLA Flexible Microelectronics on Their Way to Business", SID Digest '07 : SID International Symposium Digest of Technical Papers, 2007, vol. 38, pp. 1673-1676.

(56) References Cited

OTHER PUBLICATIONS

Kurokawa.Y et al., "UHF RFCPUS on Flexible and Glass Substrates for Secure RFID Systems", Journal of Solid-State Circuits, 2008, vol. 43, No. 1, pp. 292-299.

Jeong.J et al., "3.1: Distinguished Paper: 12.1-Inch WXGA AMOLED Display Driven by Indium—Gallium—Zinc Oxide TFTs Array", SID Digest '08 : SID International Symposium Digest of Technical Papers, May 20, 2008, vol. 39, No. 1, pp. 1-4.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Park.J et al., "Amorphous Indium—Gallium—Zinc Oxide TFTS and Their Application for Large Size AMOLED", AM-FPD '08 Digest of Technical Papers, Jul. 2, 2008, pp. 275-278.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Sakata.J et al., "Development of 4.0-In. AMOLED Display With Driver Circuit Using Amorphous In—Ga—Zn—Oxide TFTS", IDW '09 : Proceedings of the 16th International Display Workshops, 2009, pp. 689-692.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Nowatari.H et al., "60.2: Intermediate Connector With Suppressed Voltage Loss for White TANDEM OLEDS", SID Digest '09 : SID International Symposium Digest of Technical Papers, May 31, 2009, vol. 40, pp. 899-902.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Lee.M et al., "15.4:Excellent Performance of Indium—Oxide-Based Thin-Film Transistors by DC Sputtering", SID Digest '09 : SID International Symposium Digest of Technical Papers, May 31, 2009, pp. 191-193.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.

Ohara.H et al., "21.3:4.0 In. QVGA AMOLED Display Using In—Ga—Zn—Oxide TFTS With a Novel Passivation Layer", SID Digest '09 : SID International Symposium Digest of Technical Papers, May 31, 2009, pp. 284-287.

Godo.H et al., "P-9:Numerical Analysis on Temperature Dependence of Characteristics of Amorphous In—Ga—Zn—Oxide TFT", SID Digest '09 : SID International Symposium Digest of Technical Papers, May 31, 2009, pp. 1110-1112.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Ohara.H et al., "Amorphous In—Ga—Zn—Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Park.J et al., "High performance amorphous oxide thin film transistors with self-aligned top-gate structure", IEDM 09: Technical Digest of International Electron Devices Meeting, Dec. 7, 2009, pp. 191-194.

Nakamura.M, "Synthesis of Homologous Compound with New Long-Period Structure", NIRIM Newsletter, Mar. 1, 1995, vol. 150, pp. 1-4.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Orita.M et al., "Amorphous transparent conductive oxide InGaO3(ZnO)m (m<4):a Zn4s conductor", Philosophical Magazine, 2001, vol. 81, No. 5, pp. 501-515.

Janotti.A et al., "Oxygen Vacancies in ZnO", Appl. Phys. Lett. (Applied Physics Letters), 2005, vol. 87, pp. 122102-1-122102-3.

Clark.S et al., "First Principles Methods Using CASTEP", Zeitschrift fur Kristallographie, 2005, vol. 220, pp. 567-570.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Janotti.A et al., "Native Point Defects in ZnO", Phys. Rev. B (Physical Review. B), Oct. 4, 2007, vol. 76, No. 16, pp. 165202-1-165202-22.

Lany.S et al., "Dopability, Intrinsic Conductivity, and Nonstoichiometry of Transparent Conducting Oxides", Phys. Rev. Lett. (Physical Letters), Jan. 26, 2007, vol. 98, pp. 045501-1-045501-4.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.J et al., "Electronic Transport Properties of Amorphous Indium—Gallium—Zinc Oxide Semiconductor Upon Exposure to Water", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Oba.F et al., "Defect energetics in ZnO: A hybrid Hartree-Fock density functional study", Phys. Rev. B (Physical Review. B), 2008, vol. 77, pp. 245202-1-245202-6.

Kim.S et al., "High-Performance oxide thin film transistors passivated by various gas plasmas", 214th ECS Meeting, 2008, No. 2317, ECS.

Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Mo.Y et al., "Amorphous Oxide TFT Backplanes for Large Size AMOLED Displays", IDW '08 : Proceedings of the 6th International Display Workshops, Dec. 3, 2008, pp. 581-584.

(56) References Cited

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

Taiwanese Office Action (Application No. 104141289) Dated Jun. 8, 2016.

\* cited by examiner

METHOD FOR DRIVING DISPLAY DEVICE

TECHNICAL FIELD

The present invention relates to a method for driving a display device.

BACKGROUND ART

An active matrix display device has been known in which a plurality of pixels are arranged in matrix and each of the pixels includes a display element and a transistor as a switching element connected to the display element.

Further, an active matrix display device where a transistor formed using a metal oxide for a channel formation region is used as a switching element connected to each pixel electrode has attracted attention (see Patent Documents 1 and 2).

As examples of a display element applicable to an active matrix display device, a liquid crystal element and electronic ink using an electrophoretic method or the like can be given. An active matrix liquid crystal display device to which a liquid crystal element is applied has been used for a wide variety of applications ranging from display of a moving image taking advantage of high operating speed of the liquid crystal element to display of a still image with a wide range of gray levels.

REFERENCE

[Patent Document 1] Japanese Published Patent Application No. 2007-123861
[Patent Document 2] Japanese Published Patent Application No. 2007-096055

DISCLOSURE OF INVENTION

A transistor included in a conventional active matrix display device has a high off-state current and thus a signal written to a pixel leaks through the transistor and is lost even when the transistor is off. Therefore, in the case where a display element does not have a memory property, signals need to be rewritten frequently even for the same image in the active matrix display device, so that it has been difficult to reduce power consumption.

In view of the above, an object is to provide a convenient display device which consumes sufficiently small amount of power and a method for driving such a display device.

A display device begins to operate when supply of power is started and stops to operate when the supply of power is stopped. In this specification, a state where power is supplied to a display device (the power supply is on) is referred to as an on state whereas a state where the supply of power is stopped (the power supply is off) is referred to as an off state. A control signal for turning on the display device is referred to as a start signal whereas a control signal for turning off the display device is referred to as a stop signal.

The display device disclosed in this specification can be in an off state with a still image displayed in a still image display mode in which a pixel electrode and a common electrode which are for applying a voltage to the display element are brought into a floating state so that a voltage applied to the display element is held, and a still image is displayed without further supply of a potential.

When the display device is in an on state where the power supply is on so that power is supplied, a moving image display mode or a still image display mode is selected appropriately depending on image signals of successive frames, whereby power consumption can be reduced, and the display device is put to an off state by a stop means with a desired image displayed in the still image display mode, whereby the display device can have a higher level of security and can be more convenient.

In a method for driving a display device, according to an embodiment disclosed in this specification, the following steps are performed. A power supply potential is supplied from a power source to display an image on a screen. Next, an initialization and stop signal is supplied from an initialization and stop means. Then, an initialization image signal is written with the initialization and stop signal to display an initialization image on the screen. After that, the supply of the power supply potential from the power source is stopped with the initialization image displayed on the screen.

In a method for driving a display device, according to an embodiment disclosed in this specification, the following steps are performed. A power supply potential is supplied from a power source to display an image on a screen. Next, a retention and stop signal is supplied with a retention and stop means. Then, the supply of the power supply potential from the power source is stopped with the image displayed on the screen.

In the above structure, an image is displayed by applying a voltage to the display element through a transistor which is a switching element. When the supply of power is stopped, the transistor electrically connected to the display element is turned off, and the display element continues to display the image for a given length of time after the supply of power is stopped while holding the voltage and being in a floating state.

When the display device is in an on state where the power supply is on so that power is supplied, a moving image display mode or a still image display mode is selected appropriately depending on image signals of successive frames, whereby power consumption can be reduced, and the display device is put to an off state by the stop means with a desired image displayed in the still image display mode, whereby the display device can be more convenient and can have a higher level of security.

Therefore, a low-power-consumption display device which has a higher level of security and is more convenient, and a method for driving such a display device can be provided.

BEST MODE FOR CARRYING OUT THE INVENTION

Figure 1:
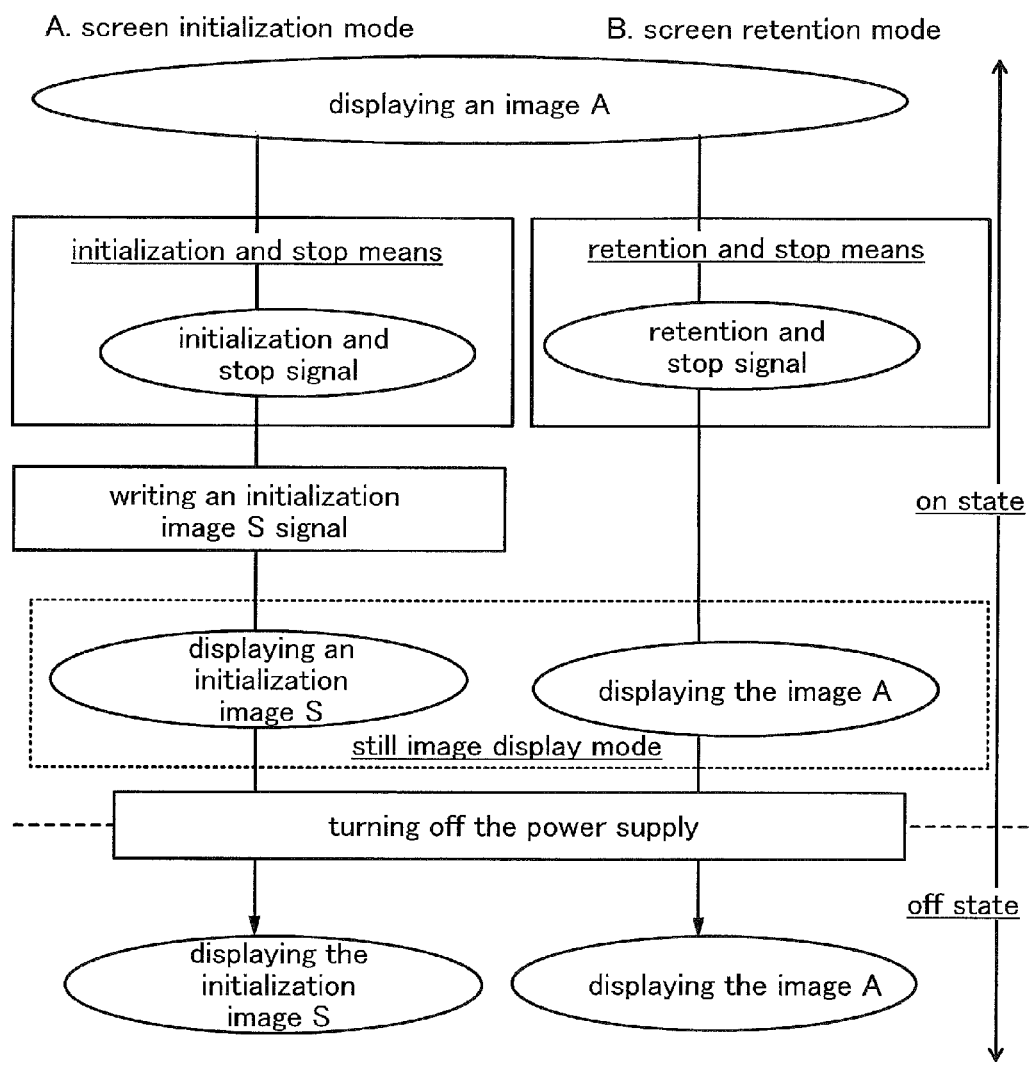
FIG. 1 illustrates one mode of a method for driving a display device.

Hereinafter, embodiments of the present invention will be described in detail with reference to drawings. Note that the present invention is not limited to the following description, and it will be easily understood by those skilled in the art that the modes and details of the present invention can be modified in various ways. Therefore, the present invention should not be construed as being limited to the following description of the embodiments.

(Embodiment 1)

In this embodiment, one mode of a display device and one mode of a method for driving the display device will be described with reference to FIG. 1, FIG. 2, FIG. 3, FIG. 4, FIGS. 5A and 5B, and FIG. 6.

The display device displays a moving image and a still image in combination on its screen. The moving image refers to an image which is recognized as a moving image with human eyes by rapid switch of a plurality of different images which are obtained by time division into a plurality of frames. Specifically, by switching images at least 60 times (60 frames) per second, a moving image with less flicker is perceived by human eyes. In contrast to a moving image and a partly moving image, a still image refers to an image formed of a plurality of images of successive frames, e.g., an n-th frame and an (n+1)-th frame, which are the same, although the plurality of images which are obtained by time division into the plurality of frames are switched at high speed.

In the display device according to one embodiment of the present invention, different display modes of a moving image display mode and a still image display mode are adopted in displaying a moving image and in displaying a still image, respectively.

In the case of moving image display where image signals of successive frames are different, the moving image display mode is employed in which an image signal is written in each frame period. On the other hand, in the case of still image display where image signals of successive frames are the same, the still image display mode is employed in which another image signal is not written, a pixel electrode and a common electrode which are for applying a voltage to a display element are brought into a floating state so that a voltage applied to the display element is held, and a still image is displayed without further supply of a potential.

In general, an on state of a display device means a display state where a voltage is applied to a display element so that display is performed, whereas an off state means a nondisplay state where a voltage is not applied to a display element so that display is not performed. In a display device, supply of power from a power source is stopped by a stop signal, resulting in a nondisplay state automatically; thus, a user cannot select display of a desired image in an off state.

The display device according to this embodiment can be in an off state with a still image displayed in the still image display mode. This is because an image can be displayed even in an off state where supply of power to the display device is stopped, when the still image display mode is employed in which a still image can be displayed without further supply of a potential.

When another image does not need to be displayed by supply of another image signal (when the use of the display device is going to be stopped) or when an image being displayed on a screen is desired to be kept temporarily, a user can put the display device to an off state with a desired image displayed on the screen, with a stop means according to this embodiment.

The display device according to this embodiment will be described with reference to a flow chart in FIG. 1.

As illustrated in FIG. 1, an image A is displayed on a display screen. When another image does not need to be displayed by supply of another image signal, an initialization and stop means is used for starting a screen initialization mode (A) in FIG. 1 in which a display screen is initialized. In either a moving image display mode or a still image display mode, when the initialization and stop means is selected to input an initialization and stop signal, an image signal of an initialization image S (initialization image S signal) is written so that the initialization image S is displayed as a still image in the still image display mode. Then, while the initialization image S is displayed, supply of power from a power source is stopped by turning off the power supply, resulting in an off state. Even in an off state, a voltage applied to a display element is held; thus, the initialization image S remains displayed for a given length of time. The initialization image S is set in advance, whereby the desired image can be displayed when the power supply is turned off and for a given length of time after the power supply is turned off. For example, the initialization image may be an image of one color, such as a white image on the entire screen or a black image on the entire screen or may be set to a mark indicating an organization or the like a user belongs to or a logo for advertisement. Therefore, a desired image can be displayed in an off state without power supply and, in addition, data of an image at the time just before the power supply is turned off can be prevented from leaking due to an afterimage or the like displayed on the screen in an off state. Consequently, the display device can display an image for a long time with low power consumption (no power consumption in an off state) and can have a high level of security.

On the other hand, when the image A being displayed on the screen is desired to be kept temporarily, a retention and stop means for starting a screen retention mode (B) in FIG. 1, in which the image A is kept, is used. When the retention and stop means is selected to input a retention and stop signal, another image is not written and the image A being displayed on the screen remains displayed as a still image in a still image mode. Then, while the image A is displayed, supply of power from the power source is stopped by turning off the power supply, resulting in an off state. Even in an off state, a voltage applied to the display element is held; thus, the image A remains displayed for a given length of time. The image can be displayed when the power supply is turned off and for a given length of time after the power supply is turned off, so that information from the image can be recognized. Thus, the display device can provide information of an image for a long time with low power consumption (no power consumption in an off state) and can be highly convenient.

Note that either in the case of using the initialization and stop means or in the case of using the retention and stop means, if an image signal of one frame is being written in inputting the initialization and stop signal or the retention and stop signal, after writing of the image signal of the frame is finished and an image displayed in an off state is displayed, the still image display mode is started in which a pixel electrode and a common electrode which are for applying a voltage to the display element are brought into a floating state so that a voltage applied to the display element is held, and a still image is displayed.

This embodiment can also be used for a transmissive display device, a reflective display device, and a transflective display device. In the cases of a transmissive display device and a transflective display device each using a light source such as a backlight, driving of the light source is needed for a given length of time after the power supply is turned off, in synchronization with the still image display mode where a desired image is displayed. In those cases, a period of time in which an image is displayed after the power supply is turned off may be set by controlling a period of time in which the light source is driven.

An example of the display device and an example of the method for driving the display device, in which a moving image mode and a still image mode are switched, in this embodiment will be described with reference to FIG. 2, FIG. 3, FIG. 4, FIGS. 5A and 5B, and FIG. 6. Note that the display device and the method for driving the display device which are disclosed in this specification are not limited to those illustrated in FIG. 2, FIG. 3, FIG. 4, FIGS. 5A and 5B, and FIG. 6.

Figure 2:
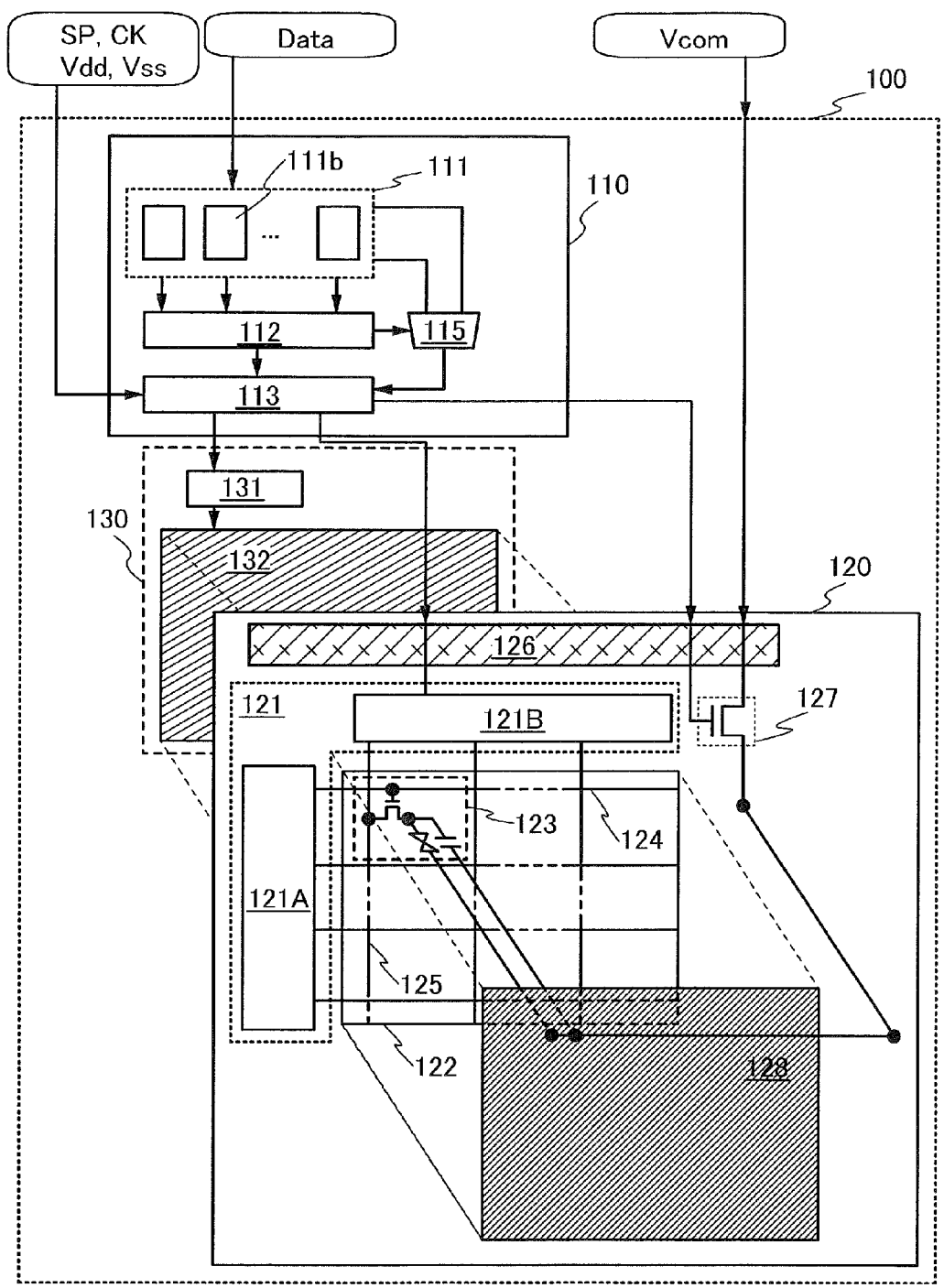
FIG. 2 illustrates one mode of a display device.

Components of a display device 100 will be described with reference to a block diagram in FIG. 2. The display device 100 is an example of a transmissive display device or transflective display device which displays an image by utilizing transmission or interruption of light in a pixel and includes an image processing circuit 110, a display panel 120, and a backlight portion 130. In the case of a reflective display device, ambient light is used as a light source; thus, the backlight portion 130 can be omitted.

A control signal, an image signal, and a power supply potential are supplied to the display device 100 from an external device connected to the display device 100. Supplied are a start pulse SP and a clock signal CK as control signals, an image signal Data as an image signal, and a high power supply potential Vdd, a low power supply potential Vss, and a common potential Vcom as power supply potentials. The power supply potential is supplied by turning on the power supply of the display device to start supply of power.

Note that a high power supply potential Vdd refers to a potential which is higher than a reference potential, and a low power supply potential Vss refers to a potential which is lower than or equal to the reference potential. It is desirable that each of the high power supply potential Vdd and the low power supply potential Vss be a potential at which a transistor can operate. The high power supply potential Vdd and the low power supply potential Vss are collectively referred to as a power supply voltage in some cases.

The common potential Vcom may be any potential as long as it serves as reference with respect to the potential of an image signal supplied to a pixel electrode. For example, the common potential Vcom may be a ground potential.

The image signal Data may be appropriately inverted in accordance with dot inversion driving, source line inversion driving, gate line inversion driving, frame inversion driving, or the like to be input to the display device 100. In the case where an image signal is an analog signal, the image signal may be converted into a digital signal through an A/D converter or the like to be supplied to the display device 100, whereby a difference between image signals can be easily detected later, which is preferable.

A configuration of the image processing circuit 110 and steps through which the image processing circuit 110 processes a signal will be described.

The image processing circuit 110 includes a memory circuit 111, a comparator circuit 112, a display control circuit 113, and a selection circuit 115. The image processing circuit 110 generates a display panel image signal and a backlight signal from the image signal Data which has been input. The display panel image signal is an image signal for controlling the display panel 120, and the backlight signal is a signal for controlling the backlight portion 130.

Further, a signal for controlling a common electrode 128 is output to a switching element 127.

The memory circuit 111 includes a plurality of frame memories for storing image signals of a plurality of frames. The number of frame memories included in the memory circuit 111 is not particularly limited and the memory circuit 111 may be an element that can store image signals of a plurality of frames. Note that the frame memory may be formed using a memory element such as a dynamic random access memory (DRAM) or a static random access memory (SRAM).

The number of the frame memories is not particularly limited as long as an image signal can be stored in each frame period. The image signal of the frame memory is selectively read out by the comparator circuit 112 and the display control circuit 113. A frame memory 111b in the drawing illustrates a memory region of one frame conceptually.

The comparator circuit 112 is a circuit which selectively reads out image signals in successive frame periods stored in the memory circuit 111, compares the image signals of the successive frames in each pixel, and detects a difference thereof.

Depending on whether there is a difference between image signals of frames, operations in the display control circuit 113 and the selection circuit 115 are determined. When a difference is detected between the frames in any of the pixels by the comparator circuit 112 (when there is a difference), the comparator circuit 112 determines that image signals are not for a still image and that successive frame periods between which the difference is detected are periods for displaying a moving image.

On the other hand, when a difference is not detected in all the pixels by comparing image signals in the comparator circuit 112 (when there is no difference), successive frame periods between which no difference is detected are determined as periods for displaying a still image. In other words, the comparator circuit 112 detects presence or absence of a difference between image signals in successive frame periods, thereby determining whether the image signals are for displaying a moving image or for displaying a still image.

The presence of the difference may be detected by the comparison when a difference exceeds a predetermined level. The comparator circuit 112 may be set so as to detect a difference in accordance with the absolute value of the difference.

Although in this embodiment, whether an image is a still image or a moving image is determined by detecting a difference between image signals in successive frame periods with the comparator circuit 112 provided in the display device 100, a signal for determining whether a moving image or a still image is displayed may be supplied externally. In that case, the signal for determining whether a moving image or a still image is displayed is directly supplied to the display control circuit 113, and the display control circuit 113 controls an image signal to be supplied to the display panel 120. Thus, the memory circuit 111, the comparator circuit 112, and the selection circuit 115 are not necessarily provided in the display device 100.

The selection circuit 115 includes, for example, a plurality of switches formed of transistors. When the comparator circuit 112 detects a difference between successive frames, that is, when an image is a moving image, an image signal of the moving image is selected from the frame memory in the memory circuit 111 and is output to the display control circuit 113.

When the comparator circuit 112 does not detect a difference between successive frames, that is, when an image is a still image, the selection circuit 115 does not output an image signal to the display control circuit 113 from the frame memory in the memory circuit 111. Since an image signal is not output to the display control circuit 113 from the frame memory, power consumption of the display device can be reduced.

In the display device according to this embodiment, a mode of operation performed when the comparator circuit 112 determines an image as a still image is a still image display mode, whereas a mode of operation performed when the comparator circuit 112 determines an image as a moving image is a moving image display mode.

The display control circuit 113 is a circuit that supplies an image signal selected by the selection circuit 115 and a control signal (specifically, a signal for controlling switch of supply and stop of supply of a control signal such as the start pulse SP or the clock signal CK) to the display panel 120 and supplies a backlight control signal (specifically, a signal for a backlight control circuit 131 to control turning on and off of the backlight) to the backlight portion 130.

Note that the image processing circuit described as an example in this embodiment may have a function of switching display modes. With the function of switching display modes provided, a user of the display device switches display modes between the moving image display mode and the still image display mode by selecting an operation mode of the display device manually or with a device externally connected to the display device.

The selection circuit 115 may output an image signal to the display control circuit 113 in accordance with a signal input from a display mode switching circuit.

For example, in the case where operation is performed in the still image display mode, when a mode switching signal is input from the display mode switching circuit to the selection circuit 115, the selection circuit 115 can execute a mode where image signals which have been input are sequentially output to the display control circuit 113, namely, the moving image display mode, even if the comparator circuit 112 does not detect a difference between the image signals in successive frame periods. Meanwhile, in the case where operation is performed in the moving image display mode, when a mode switching signal is input from the display mode switching circuit to the selection circuit 115, the selection circuit 115 can execute a mode where only an image signal in one frame which has been selected is output to the display control circuit 113, namely, the still image display mode, even if the comparator circuit 112 detects a difference between image signals in successive frame periods. Consequently, the display device according to this embodiment displays the one frame of a moving image, as a still image.

The display device may further include a photometric circuit. Provided with a photometric circuit, the display device can detect ambient luminance of the display device. Thus, the display control circuit 113 to which the photometric circuit is connected can control a method for driving a light source such as a backlight in accordance with a signal input from the photometric circuit.

For example, when it is determined that the display device is being used in dim light by detection from the photometric circuit, the display control circuit 113 controls the intensity of light emitted from a backlight 132 so that it increases for favorable visibility of a display screen. In contrast, when it is determined that the display device is used in extremely bright outside light (e.g., in direct sunlight), the display control circuit 113 controls the intensity of light emitted from the backlight 132 so that it decreases for reduction in power consumed by the backlight 132.

The backlight portion 130 includes the backlight control circuit 131 and the backlight 132. Components of the backlight 132 may be selected to be combined in accordance with the use of the display device 100, and for example, a cold-cathode tube, a light-emitting diode (LED), or the like can be used. By combining color filters, color display can be performed. The backlight 132 can be provided with a white light-emitting element (e.g., LED), for example. Note that a color filter is not necessarily provided in the case where light-emitting diodes of RGB or the like are arranged in the backlight 132 and a successive additive color mixing method (a field sequential method) is employed in which color display is performed by time division. A power supply potential and a backlight signal for controlling the backlight are supplied from the display control circuit 113 to the backlight control circuit 131.

The display panel 120 includes a pixel portion 122 and a switching element 127. In this embodiment, the display panel 120 includes a first substrate and a second substrate. The first substrate is provided with a driver circuit portion 121, the pixel portion 122, and the switching element 127. The second substrate is provided with a common connection portion (also called a common contact) and the common electrode 128 (also called a counter electrode). Note that the common connection portion electrically connects the first substrate and the second substrate to each other and may be provided over the first substrate.

A plurality of gate lines 124 (scan lines) and a plurality of source lines 125 (signal lines) are provided for the pixel portion 122, and the pixel portion 122 includes a plurality of pixels arranged in matrix each surrounded by the gate lines 124 and the source lines 125. In the case of the display panel 120 described as an example in this embodiment, the gate lines 124 are extended from a gate line driver circuit 121A and the source lines 125 are extended from a source line driver circuit 121B.

The pixel 123 includes a transistor, a capacitor, and a display element, and a pixel electrode connected to the transistor. The pixel electrode transmits visible light.

The transistor included in the pixel 123 has a low off-state current. When the transistor is off, charge stored in the display element and the capacitor which are connected to the transistor having a low off-state current is not likely to leak through the transistor, so that data written before the transistor is turned off can be maintained for a long time.

As an example of the display element, a liquid crystal element can be given. For example, a liquid crystal element is formed by sandwiching a liquid crystal layer between the pixel electrode and the common electrode which faces the pixel electrode.

An example of the liquid crystal element is an element which controls transmission or interruption of light by optical modulation action of liquid crystal. The element can include a pair of electrodes and a liquid crystal layer. Note that the optical modulation action of liquid crystal is controlled by an electric field applied to the liquid crystal (that is, a vertical electric field).

The following are examples of liquid crystal applicable to a liquid crystal element: nematic liquid crystal, cholesteric liquid crystal, smectic liquid crystal, discotic liquid crystal, thermotropic liquid crystal, lyotropic liquid crystal, low-molecular liquid crystal, polymer dispersed liquid crystal (PDLC), ferroelectric liquid crystal, anti-ferroelectric liquid crystal, main-chain liquid crystal, side-chain polymer liquid crystal, and banana-shaped liquid crystal.

Further, examples of a method for driving liquid crystal include a twisted nematic (TN) mode, a super twisted nematic (STN) mode, an optically compensated birefringence (OCB) mode, an electrically controlled birefringence (ECB) mode, a ferroelectric liquid crystal (FLC) mode, an antiferroelectric liquid crystal (AFLC) mode, a polymer dispersed liquid crystal (PDLC) mode, a polymer network liquid crystal (PNLC) mode, and a guest-host mode.

The driver circuit portion 121 includes the gate line driver circuit 121A and the source line driver circuit 121B. The gate line driver circuit 121A and the source line driver circuit 121B are driver circuits for driving the pixel portion 122 including the plurality of pixels and include shift register circuits (also called shift registers).

Note that the gate line driver circuit 121A and the source line driver circuit 121B, and the pixel portion 122 or the switching element 127 may be formed over the same substrate or different substrates.

The high power supply potential Vdd, the low power supply potential Vss, the start pulse SP, the clock signal CK, and the image signal Data which are controlled by the display control circuit 113 are supplied to the driver circuit portion 121.

A terminal portion 126 is an input terminal for supplying a predetermined signal (such as the high power supply potential Vdd, the low power supply potential Vss, the start pulse SP, the clock signal CK, the image signal Data, or the common potential Vcom) or the like, which is output from the display control circuit 113 included in the image processing circuit 110, to the driver circuit portion 121.

The switching element 127 supplies the common potential Vcom to the common electrode 128 in accordance with a control signal output from the display control circuit 113. For the switching element 127, a transistor can be used. A gate electrode of the transistor is connected to the display control circuit 113, the common potential Vcom is supplied to one of a source electrode and a drain electrode of the transistor through the terminal portion 126, and the other of the source electrode and the drain electrode is connected to the common electrode 128. Note that the switching element 127 and the driver circuit portion 121 or the pixel portion 122 may be formed over the same substrate or different substrates.

The common connection portion electrically connects the common electrode 128 and a terminal, which is connected to the source electrode or the drain electrode of the switching element 127, to each other.

As a specific example of the common connection portion, a conductive particle in which an insulating sphere is coated with a thin metal film may be used, so that electrical connection is made. Note that the first substrate and the second substrate may be provided with a plurality of common connection portions.

The common electrode 128 is provided so as to face a plurality of pixel electrodes in the pixel portion 122 with a liquid crystal layer therebetween. Further, the common electrode 128 and the pixel electrode included in the pixel portion 122 may have a variety of opening patterns.

Figure 3:
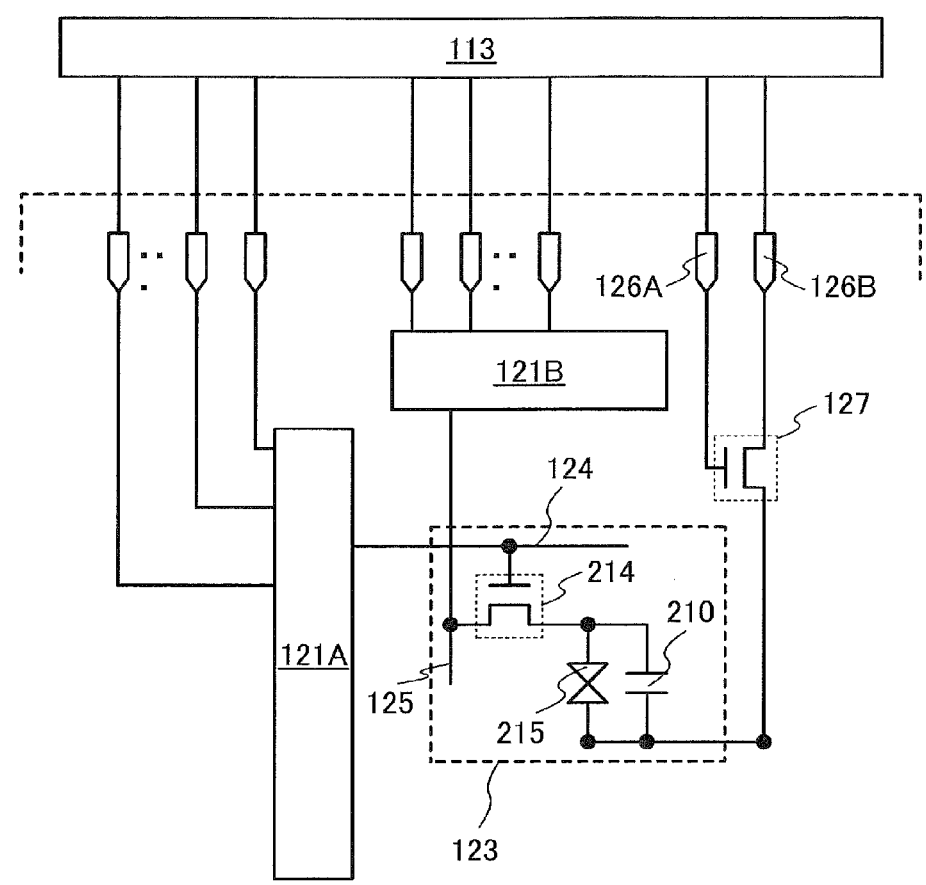
FIG. 3 illustrates one mode of a display device.

Next, the configuration of the pixel 123 included in the pixel portion 122 will be described with reference to an equivalent circuit diagram illustrated in FIG. 3.

The pixel 123 includes a transistor 214, a display element 215, and a capacitor 210. In this embodiment, a liquid crystal element is used as the display element 215. The liquid crystal element is formed in such a manner that a liquid crystal layer is provided between the pixel electrode over the first substrate and the common electrode 128 on the second substrate.

A gate electrode of the transistor 214 is connected to one of the plurality of gate lines 124 provided in the pixel portion, one of a source electrode and a drain electrode of the transistor 214 is connected to one of the plurality of source lines 125, and the other of the source electrode and the drain electrode of the transistor 214 is connected to one of electrodes of the capacitor 210 and one of electrodes of the display element 215.

As the transistor 214, a transistor having a lower off-state current is used. When the transistor 214 is off, charge stored in the display element 215 and the capacitor 210 which are connected to the transistor 214 having a lower off-state current is not likely to leak through the transistor 214 which is off, so that data written before the transistor 214 is turned off can be maintained for a long time.

With such a structure, the capacitor 210 can hold a voltage applied to the display element 215. Note that the capacitor 210 is not necessarily provided. The electrode of the capacitor 210 may be connected to a capacitor line provided separately.

One of the source electrode and the drain electrode of the switching element 127 for which a transistor which is one mode of a switching element is used is connected to the other electrode of the capacitor 210 and the other electrode of the display element 215, which are not connected to the transistor 214, and the other of the source electrode and the drain electrode of the switching element 127 is connected to a terminal 126B through the common connection portion. The gate electrode of the switching element 127 is connected to a terminal 126A.

Next, states of signals supplied to the pixels will be described with reference to the equivalent circuit diagram in FIG. 3 and a timing chart in FIG. 4.

Figure 4:
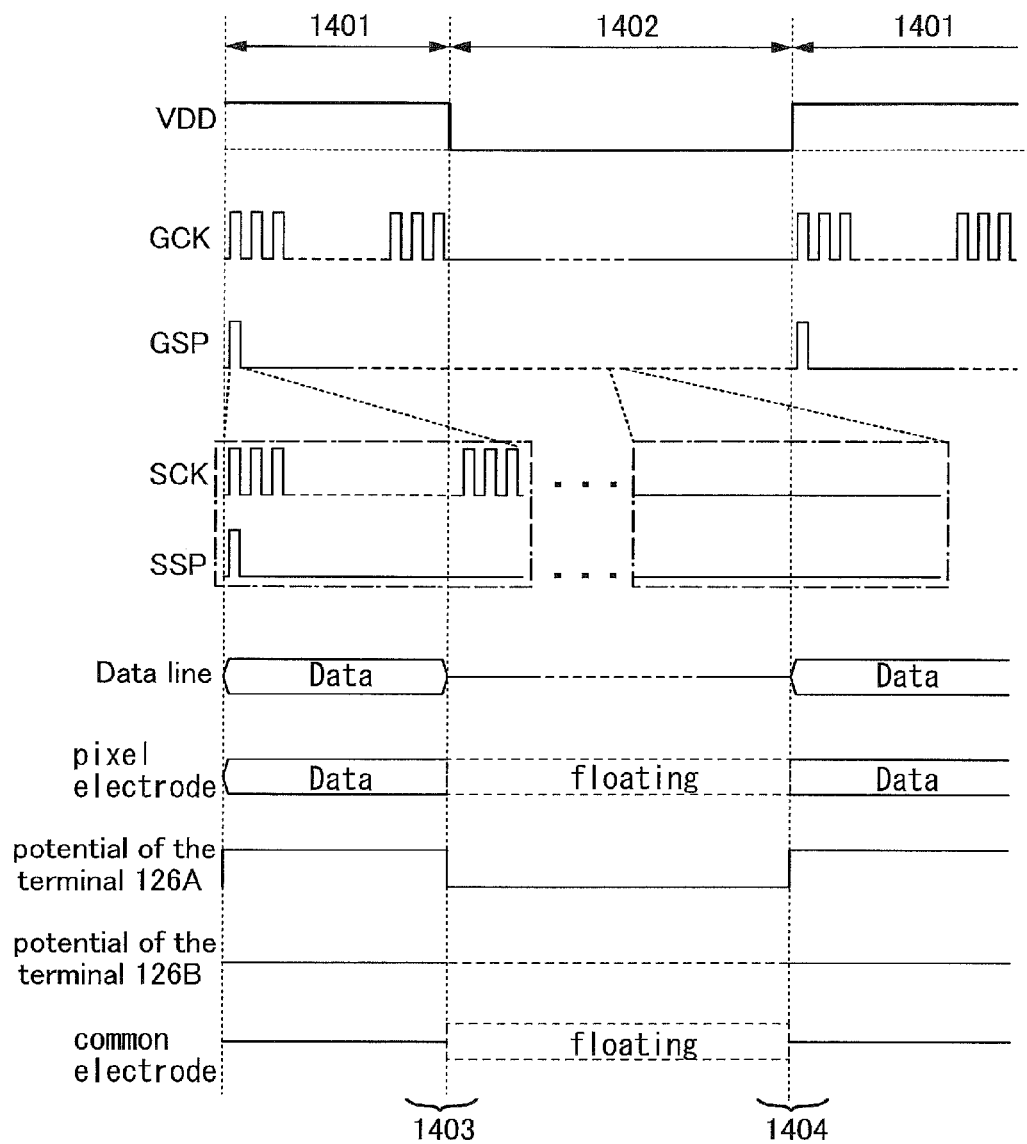
FIG. 4 is a timing chart illustrating one mode of a method for driving a display device.

FIG. 4 illustrates a clock signal GCK and a start pulse GSP which are supplied to the gate line driver circuit 121A by the display control circuit 113. FIG. 4 also illustrates a clock signal SCK and a start pulse SSK which are supplied to the source line driver circuit 121B by the display control circuit 113. In order to describe the timing of output of each of the clock signals, the waveforms of the clock signals are illustrated with simple square waves.

In addition, FIG. 4 illustrates a potential of the source line 125, a potential of the pixel electrode, a potential of the terminal 126A, a potential of the terminal 126B, and a potential of the common electrode.

In FIG. 4, a period 1401 corresponds to a period during which image signals for displaying a moving image are written. In the period 1401, operation is performed so that the image signals and the common potential are supplied to the pixels in the pixel portion 122 and the common electrode, respectively.

Further, a period 1402 corresponds to a period during which a still image is displayed. In the period 1402, the supply of the image signals to the pixels in the pixel portion 122 and the supply of the common potential to the common electrode are stopped. Note that each signal is supplied in the period 1402 so that operation of the driver circuit portion is stopped in FIG. 4; however, it is preferable to prevent deterioration of a still image by writing image signals periodically in accordance with the length of the period 1402 and the refresh rate.

First, the timing chart in the period 1401 will be described. In the period 1401, the clock signal GCK is supplied at all times; the start pulse GSP is supplied in accordance with a vertical synchronizing frequency; the clock signal SCK is supplied at all times; and the start pulse SSP is supplied in accordance with one gate selection period.

In addition, the image signal Data is supplied to the pixel of each row through the source line 125, and the potential of the source line 125 is supplied to the pixel electrode in accordance with the potential of the gate line 124.

Further, the display control circuit 113 supplies a potential, at which the switching transistor 127 is turned on, to the terminal 126A of the switching element 127 and the common potential to the common electrode through the terminal 126B.

On the other hand, the period 1402 is a period during which a still image is displayed. The timing chart in the period 1402 will be described. In the period 1402, the supply of the clock signal GCK, the start pulse GSP, the clock signal SCK, and the start pulse SSP is stopped; and the supply of the image signal Data, which has been supplied to the source line 125, is also stopped. In the period 1402 where the supply of both the clock signal GCK and the start pulse GSP is being stopped, the transistor 214 is off and the pixel electrode is in a floating state.

Further, the display control circuit 113 supplies a potential, at which the switching transistor 127 is turned off, to the terminal 126A of the switching transistor 127 so that the common electrode is brought into a floating state.

In the period 1402, both electrodes of the display element 215, i.e., the pixel electrode and the common electrode are brought into a floating state; thus, a still image can be displayed without further supply of a potential.

Further, the supply of a clock signal and a start pulse to the gate line driver circuit 121A and the source line driver circuit 121B is stopped, whereby low power consumption can be achieved.

In particular, by using a transistor having a lower off-state current is used as each of the transistor 214 and the switching element 127, reduction over time in voltage applied to the both electrodes of the display element 215 can be suppressed.

Figure 5A:
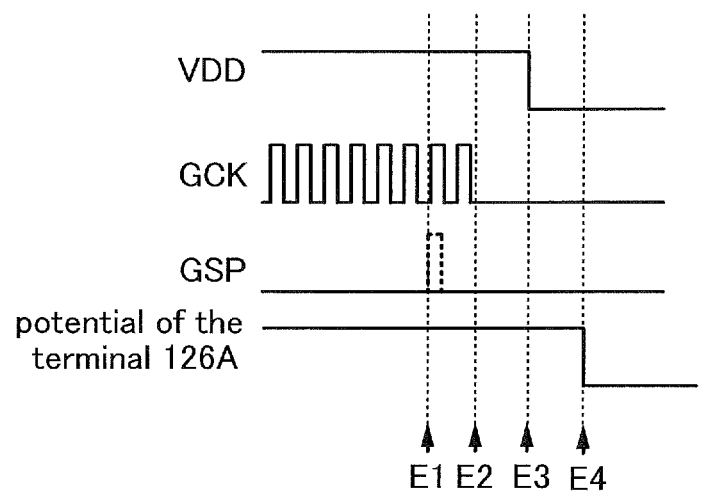
FIGS. 5A and 5B are timing charts each illustrating one mode of a method for driving a display device.
Figure 5B:
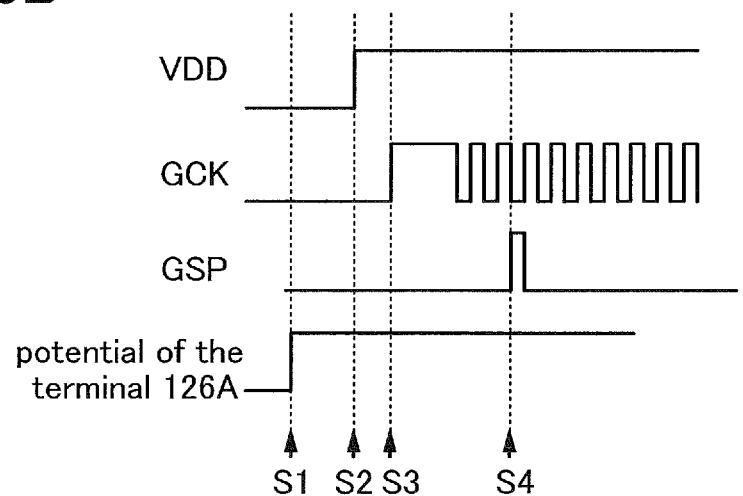

Next, operations of the display control circuit in a period during which a moving image is switched to a still image (a period 1403 in FIG. 4) and in a period during which a still image is switched to a moving image (a period 1404 in FIG. 4) will be described with reference to FIGS. 5A and 5B. FIGS. 5A and 5B show the high power supply potential Vdd, the clock signal (here, GCK), the start pulse signal (here, GSP), and the potential of the terminal 126A, which are signals output from the display control circuit.

FIG. 5A shows operation of the display control circuit in the period 1403 during which a moving image is switched to a still image. The display control circuit stops the supply of the start pulse GSP (E1 in FIG. 5A, a first step). Next, supply of a plurality of clock signals GCK is stopped after pulse output reaches the last stage of the shift register (E2 in FIG. 5A, a second step). Then, the high power supply potential Vdd of a power supply voltage is changed to the low power supply potential Vss (E3 in FIG. 5A, a third step). After that, the potential of the terminal 126A is changed to a potential at which the switching transistor 127 is turned off (E4 in FIG. 5A, a fourth step).

Through the above steps, the supply of the signals to the driver circuit portion 121 can be stopped without malfunction of the driver circuit portion 121. Malfunction at the time when a moving image is switched to a still image generates noise and the noise is held as a still image; thus, the display device provided with the display control circuit which is unlikely to malfunction can display a still image which is hardly deteriorated.

Next, FIG. 5B shows operation of the display control circuit in the period 1404 during which a still image is switched to a moving image. With the display control circuit, the potential of the terminal 126A is changed to a potential at which the switching transistor 127 is turned on (S1 in FIG. 5B, a first step). Then, a power supply voltage is changed from the low power supply potential Vss to the high power supply potential Vdd (S2 in FIG. 5B, a second step). After that, a high potential is supplied as the clock signal GCK and then, a plurality of clock signals GCK are supplied (S3 in FIG. 5B, a third step). Next, the start pulse signal GSP is supplied (S4 in FIG. 5B, a fourth step).

Through the above steps, the supply of the signals to the driver circuit portion 121 can be restarted without malfunction of the driver circuit portion 121. Potentials of the wirings are sequentially changed back to those at the time of displaying a moving image, whereby the driver circuit portion can be driven without malfunction.

Figure 6:
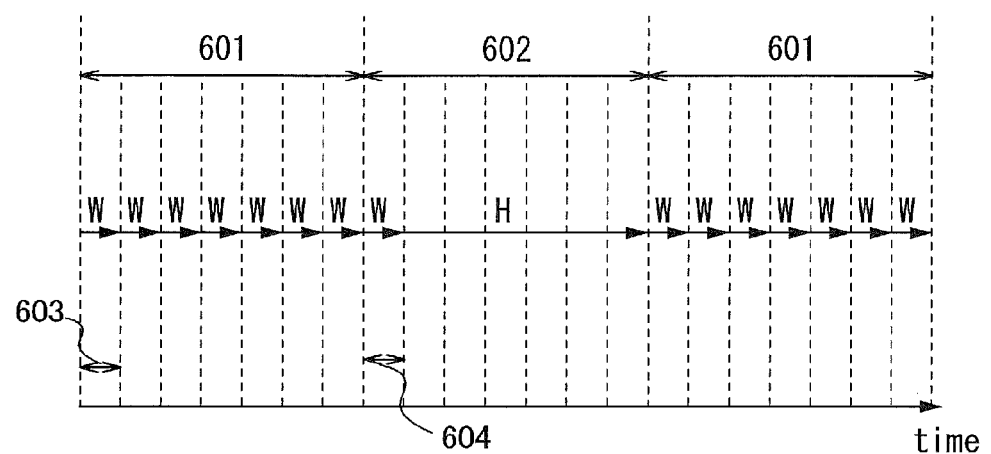
FIG. 6 illustrates one mode of a method for driving a display device.

FIG. 6 schematically shows the frequency of writing of image signals in frame periods in a period 601 during which a moving image is displayed and a period 602 during which a still image is displayed. In FIG. 6, "W" indicates a period during which an image signal is written, and "H" indicates a period during which the image signal is held. In addition, a period 603 is one frame period in FIG. 6; however, the period 603 may be a different period.

Thus, in the structure of the display device according to this embodiment, an image signal of a still image displayed in the period 602 is written in the period 604 and the image signal written in the period 604 is held in the other periods in the period 602.

In the display device described as an example in this embodiment, the frequency of writing of image signals in a period during which a still image is displayed can be reduced. Consequently, power consumption at the time when a still image is displayed can be reduced.

In the case where a still image is displayed by rewriting the same images a plurality of times, the human eyes may recognize switching of images, which leads to eyestrain. Since the frequency of writing of image signals is reduced in the display device according to this embodiment, eyestrain can be less severe.

Particularly in the display device according to this embodiment, transistors each having a lower off-state current are provided in the pixels and used for the switching element of the common electrode, so that a voltage can be held in a storage capacitor for a longer period (time). Thus, the frequency of writing of image signals can be reduced remarkably, resulting in significant reduction in power consumption at the time when a still image is displayed and considerably less severe eyestrain.

As described above, when the display device is in an on state where the power supply is on so that power is supplied, the moving image display mode or the still image display mode is selected appropriately depending on image signals of successive frames, whereby power consumption can be reduced, and the display device is put to an off state by the stop means with a desired image displayed in the still image display mode, whereby the level of security and the level of convenience can be improved.

Therefore, the display device can be more convenient and low-power-consumption and the method for driving such a display device can be provided.

(Embodiment 2)

In this embodiment, another example of a transistor which can be applied to the display device disclosed in this specification will be described. There is no particular limitation on the structure of the transistor which can be applied to the display device disclosed in this specification and for example, a top gate structure or a bottom gate structure such as a staggered structure or a planar structure can be employed. The transistor may have a single-gate structure in which one channel formation region is formed, a double-gate structure in which two channel formation regions are formed, or a triple-gate structure in which three channel formation regions are formed. Alternatively, the transistor may have a dual gate structure including two gate electrode layers provided over and below a channel region with a gate insulating layer provided therebetween. FIGS. 7A to 7D illustrate examples of cross-sectional structures of transistors. The transistors illustrated in FIGS. 7A to 7D each include an oxide semiconductor as a semiconductor. An advantage of using an oxide semiconductor is that high mobility and a low off-state current can be obtained in a relatively easy and low-temperature process; however, it is needless to say that another semiconductor may be used.

Figure 7A:
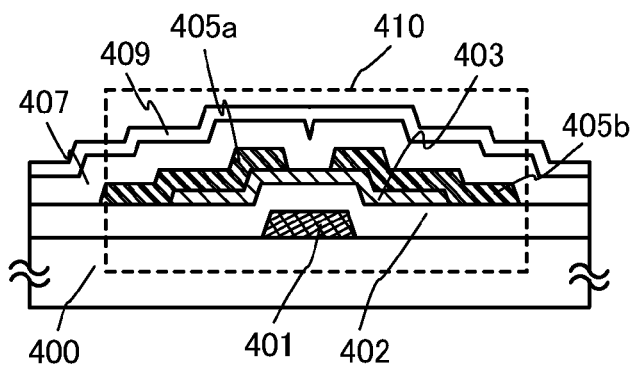
FIGS. 7A to 7D each illustrate one mode of a transistor applicable to a display device.

A transistor 410 illustrated in FIG. 7A is one of bottom-gate thin film transistors and is also referred to as an inverted staggered thin film transistor.

The transistor 410 includes, over a substrate 400 having an insulating surface, a gate electrode layer 401, a gate insulating layer 402, an oxide semiconductor layer 403, a source electrode layer 405a, and a drain electrode layer 405b. An insulating layer 407 that covers the transistor 410 is stacked over the oxide semiconductor layer 403. A protective insulating layer 409 is formed over the insulating layer 407.

Figure 7B:
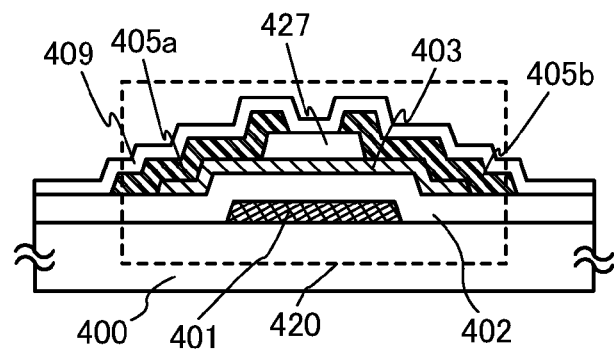

A transistor 420 illustrated in FIG. 7B is one of bottom-gate transistors referred to as a channel-protective transistor (channel-stop transistor) and is also referred to as an inverted staggered thin film transistor.

The transistor 420 includes, over the substrate 400 having an insulating surface, a gate electrode layer 401, the gate insulating layer 402, the oxide semiconductor layer 403, the insulating layer 427 that functions as a channel-protective layer covering a channel formation region of the oxide semiconductor layer 403, the source electrode layer 405a, and the drain electrode layer 405b. The protective insulating layer 409 is formed to cover the transistor 420.

Figure 7C:
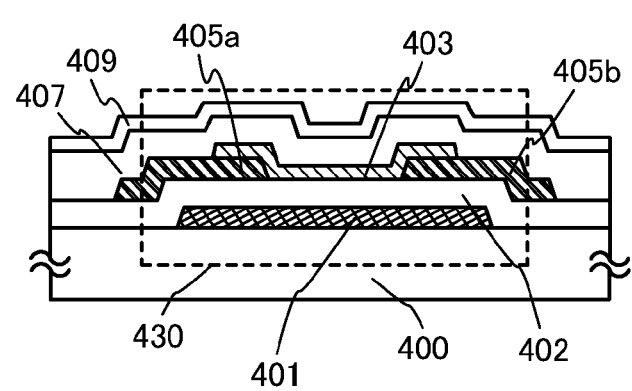

The transistor 430 illustrated in FIG. 7C is a bottom-gate thin film transistor and includes, over the substrate 400 which is a substrate having an insulating surface, the gate electrode layer 401, the gate insulating layer 402, the source electrode layer 405a, the drain electrode layer 405b, and the oxide semiconductor layer 403. In addition, the insulating layer 407 is provided to cover the transistor 430 and be in contact with the oxide semiconductor layer 403. The protective insulating layer 409 is formed over the insulating layer 407.

In the transistor 430, the gate insulating layer 402 is provided over and in contact with the substrate 400 and the gate electrode layer 401; and the source electrode layer 405a and the drain electrode layer 405b are provided over and in contact with the gate insulating layer 402. Further, the oxide semiconductor layer 403 is provided over the gate insulating layer 402, the source electrode layer 405a, and the drain electrode layer 405b.

Figure 7D:
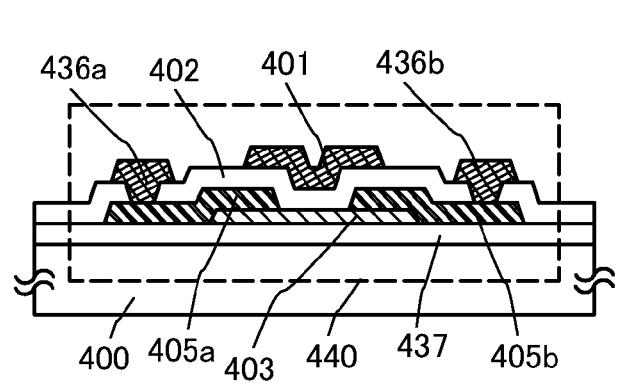

A thin film transistor 440 illustrated in FIG. 7D is one of top-gate thin film transistors. The transistor 440 includes, over the substrate 400 having an insulating surface, an insulating layer 437, the oxide semiconductor layer 403, the source electrode layer 405a, the drain electrode layer 405b, the gate insulating layer 402, and the gate electrode layer 401. A wiring layer 436a and a wiring layer 436b are provided in contact with and electrically connected to the source electrode layer 405a and the drain electrode layer 405b, respectively.

In this embodiment, the oxide semiconductor layer 403 is used as a semiconductor layer, as described above. As an oxide semiconductor used for the oxide semiconductor layer 403, an oxide of four metal elements such as an In—Sn—Ga—Zn—O-based oxide semiconductor; an oxide of three metal elements such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor; or an oxide of two metal elements such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, or an In—Mg—O-based oxide semiconductor; an In—O-based oxide semiconductor; a Sn—O-based oxide semiconductor; or a Zn—O-based oxide semiconductor can be used. Further, $SiO_2$ may be contained in the above oxide semiconductor. Here, for example, an In—Ga—Zn—O-based oxide semiconductor is an oxide containing at least In, Ga, and Zn, and there is no particular limitation on the composition ratio thereof. Further, the In—Ga—Zn—O-based oxide semiconductor may contain an element other than In, Ga, and Zn.

For the oxide semiconductor layer 403, a thin film expressed by the chemical formula, $InMO_3(ZnO)_m$ (m>0), can be used. Here, M represents one or more metal elements selected from Ga, Al, Mn, and Co. For example, M can be Ga, Ga and Al, Ga and Mn, Ga and Co, or the like.

In the transistors 410, 420, 430, and 440 each including the oxide semiconductor layer 403, a current value in an off state (off-state current value) can be reduced. Therefore, an electrical signal such as an image signal can be held for a longer time, so that a writing interval can be set longer. Accordingly, frequency of refresh operation can be reduced, which leads to an effect of suppressing power consumption.

Moreover, a period during which a still image can be displayed while the power supply is off can be longer, resulting in improvement in convenience.

Further, in the transistors 410, 420, 430, and 440 each including the oxide semiconductor layer 403, relatively high field-effect mobility can be obtained, whereby high-speed operation is possible. Therefore, by using any of the transistors in a pixel portion of the display device, color separation can be suppressed and a high-quality image can be provided. Since the transistors in a circuit portion and the pixel portion can be separately formed over one substrate, the number of components of the display device can be reduced.

Although there is no particular limitation on a substrate used for the substrate 400 having an insulating surface, a glass substrate of barium borosilicate glass, aluminoborosilicate glass, or the like is used.

In the bottom-gate transistors 410, 420, and 430, an insulating film serving as a base film may be provided between the substrate and the gate electrode layer. The base film has a function of preventing diffusion of an impurity element from the substrate, and can be formed to have a single-layer or layered structure using one or more films selected from a silicon nitride film, a silicon oxide film, a silicon nitride oxide film, and a silicon oxynitride film.

The gate electrode layer 401 can be formed to have a single-layer or layered structure using a metal material such as molybdenum, titanium, chromium, tantalum, tungsten, aluminum, copper, neodymium, or scandium, or an alloy material which contains any of these materials as its main component.

The gate insulating layer 402 can be formed to have a single-layer or layered structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. For example, by a plasma CVD method, a silicon nitride layer ($SiN_y$(y>0)) with a thickness of 50 nm to 200 nm inclusive is formed as a first gate insulating layer, and a silicon oxide layer ($SiO_x$ (x>0)) with a thickness of 5 nm to 300 nm inclusive is formed as a second gate insulating layer over the first gate insulating layer, so that a gate insulating layer with a total thickness of 200 nm is formed.

A conductive film used for the source electrode layer 405a and the drain electrode layer 405b can be formed using an element selected from Al, Cr, Cu, Ta, Ti, Mo, and W, an alloy film containing any of these elements, an alloy film containing a combination of any of these elements, or the like. Alternatively, a structure may be employed in which a high-melting-point metal layer of Ti, Mo, W, or the like is provided over and/or below a metal layer of Al, Cu, or the like. In addition, heat resistance can be increased by using an Al material to which an element (Si, Nd, Sc, or the like) which prevents generation of a hillock or a whisker in an Al film is added.

A material similar to that of the source electrode layer 405a and the drain electrode layer 405b can be used for a conductive film such as the wiring layer 436a and the wiring layer 436b which are connected to the source electrode layer 405a and the drain electrode layer 405b, respectively.

Alternatively, the conductive film to be the source electrode layer 405a and drain electrode layer 405b (including a wiring layer formed in the same layer as the source and drain electrode layers) may be formed using a conductive metal oxide. As the conductive metal oxide, indium oxide ($In_2O_3$), tin oxide ($SnO_2$), zinc oxide (ZnO), an indium oxide-tin oxide alloy ($In_2O_3$—$SnO_2$, abbreviated to ITO), an indium oxide-zinc oxide alloy ($In_2O_3$—ZnO), or any of these metal oxide materials containing silicon oxide can be used.

As each of the insulating layers 407, 427, and 437, typically, an inorganic insulating film such as a silicon oxide film, a silicon oxynitride film, an aluminum oxide film, or an aluminum oxynitride film can be used.

As the protective insulating layer 409, an inorganic insulating film such as a silicon nitride film, an aluminum nitride film, a silicon nitride oxide film, or an aluminum nitride oxide film can be used.

In addition, a planarization insulating film may be formed over the protective insulating layer 409 in order to reduce surface unevenness due to the transistor. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed using any of these materials.

Thus, by using the transistor including an oxide semiconductor layer having a small off-state current value in this embodiment, the display device consumes a smaller amount of power, can display a desired image in an off state, and thus can be highly convenient.

(Embodiment 3)

In this embodiment, an example of a transistor including an oxide semiconductor layer and an example of a method for manufacturing the transistor including an oxide semiconductor layer will be described in detail with reference to FIGS. 8A to 8E. The same portions as those in the above embodiments and portions having functions similar to those of the portions in the above embodiments and steps similar to those in the above embodiments may be handled as in the above embodiments, and repeated description is omitted. In addition, detailed description of the same portions is not repeated.

FIGS. 8A to 8E illustrate an example of cross-sectional structures of a transistor. A transistor 510 illustrated in FIGS. 8A to 8E is a bottom-gate inverted-staggered thin film transistor which is similar to the transistor 410 illustrated in FIG. 7A.

An oxide semiconductor used for a semiconductor layer in this embodiment is an i-type (intrinsic) or substantially i-type (intrinsic) oxide semiconductor. The i-type (intrinsic) or substantially i-type (intrinsic) oxide semiconductor is obtained in such a manner that hydrogen, which is an n-type impurity, is removed from an oxide semiconductor, and the oxide semiconductor is highly purified so as to contain as few impurities that are not main components of the oxide semiconductor as possible. In other words, a highly-purified i-type (intrinsic) semiconductor or a semiconductor close thereto is obtained not by adding impurities but by reducing impurities such as hydrogen or water as much as possible. Thus, the oxide semiconductor layer included in the transistor 510 is an oxide semiconductor layer which is highly purified and made to be electrically i-type (intrinsic).

Further, a purified oxide semiconductor includes extremely few carriers (close to zero), and the carrier concentration thereof is lower than $1\times10^{14}/cm^3$, preferably lower than $1\times10^{12}/cm^3$, more preferably lower than $1\times10^{11}/cm^3$.

Since the oxide semiconductor includes extremely few carriers, an off-state current can be reduced in the transistor. The smaller the amount of off-state current is, the better.

Specifically, in the transistor including the oxide semiconductor layer, off-state current density per micrometer in a channel width at room temperature can be less than or equal to 10 aA/μm ($1\times10^{-17}$ A/μm), further less than or equal to 1 aA/μm ($1\times10^{-18}$ A/μm), still further less than or equal to 10 zA/μm ($1\times10^{-20}$ A/μm).

When a transistor whose current value in an off state (an off-state current value) is extremely small is used as a transistor in the pixel portion of Embodiment 1, refresh operation in a still image region can be performed writing image data a small number of times.

In addition, in the transistor 510 including the oxide semiconductor layer, the temperature dependence of an on-state current is hardly observed, and an off-state current remains extremely low.

Steps of manufacturing the transistor 510 over a substrate 505 will be described below with reference to FIGS. 8A to 8E.

First, a conductive film is formed over the substrate 505 having an insulating surface, and then, a gate electrode layer 511 is formed through a first photolithography process. Note that a resist mask may be formed by an inkjet method.

Formation of the resist mask by an inkjet method needs no photomask; thus, the manufacturing cost can be reduced.

As the substrate 505 having an insulating surface, a substrate similar to the substrate 400 described in Embodiment 2 can be used. In this embodiment, a glass substrate is used as the substrate 505.

An insulating film serving as a base film may be provided between the substrate 505 and the gate electrode layer 511. The base film has a function of preventing diffusion of an impurity element from the substrate 505, and can be formed to have a single-layer or layered structure using one or more films selected from a silicon nitride film, a silicon oxide film, a silicon nitride oxide film, and a silicon oxynitride film.

The gate electrode layer 511 can be formed to have a single-layer or layered structure using a metal material such as molybdenum, titanium, tantalum, tungsten, aluminum, copper, neodymium, or scandium, or an alloy material which contains any of these materials as its main component.

Then, the gate insulating layer 507 is formed over the gate electrode layer 511. The gate insulating layer 507 can be formed to have a single-layer or layered structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like.

As the oxide semiconductor layer in this embodiment, an oxide semiconductor which is made to be an i-type or substantially i-type by removing impurities is used. Such a highly-purified oxide semiconductor is quite susceptible to an interface level or interface charge; therefore, an interface between the oxide semiconductor layer and the gate insulating layer is important. For that reason, the gate insulating layer that is to be in contact with a highly-purified oxide semiconductor needs to have high quality.

For example, a high-density plasma CVD method using microwaves (with a frequency of, for example, 2.45 GHz) is preferably employed because an insulating film which is dense and has high withstand voltage and high quality can be formed. When a highly-purified oxide semiconductor and a high-quality gate insulating layer are in close contact with each other, the interface level can be reduced and interface characteristics can be favorable.

It is needless to say that another film formation method such as a sputtering method or a plasma CVD method can be employed as long as a high-quality insulating layer can be formed as a gate insulating layer. Moreover, it is possible to form an insulating layer whose quality and characteristics of an interface with an oxide semiconductor are improved through heat treatment performed after the formation of the insulating layer. In any case, an insulating layer that has favorable quality as the gate insulating layer and can reduce interface state density with an oxide semiconductor to form a favorable interface is formed.

Further, in order that hydrogen, a hydroxyl group, and moisture might be contained in the gate insulating layer 507 and an oxide semiconductor film 530 as little as possible, it is preferable that the substrate 505 over which the gate electrode layer 511 is formed or the substrate 505 over which layers up to and including the gate insulating layer 507 are formed be preheated in a preheating chamber of a sputtering apparatus as pretreatment for formation of the oxide semiconductor film 530 so that impurities such as hydrogen and moisture adsorbed to the substrate 505 are eliminated and evacuation is performed. As an evacuation means provided in the preheating chamber, a cryopump is preferable. Note that this preheating treatment may be omitted. This preheating step may be similarly performed on the substrate 505 over which layers up to and including a source electrode layer 515a and a drain electrode layer 515b are formed before formation of an insulating layer 516.

Figure 8A:
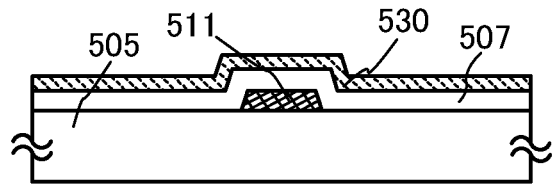
FIGS. 8A to 8E illustrate one mode of a method for manufacturing a transistor applicable to a display device.
Figure 8B:
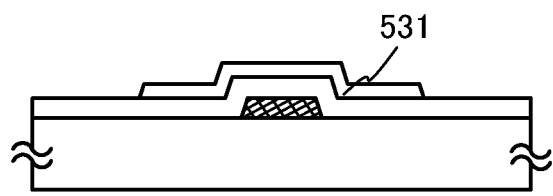
Figure 8C:
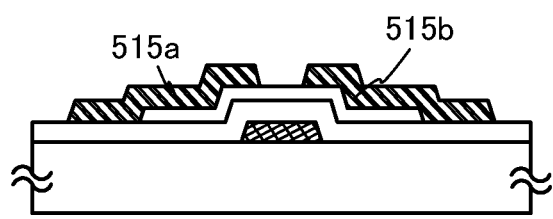

Next, the oxide semiconductor film 530 having a thickness of 2 nm to 200 nm inclusive, preferably 5 nm to 30 nm inclusive is formed over the gate insulating layer 507 (see FIG. 8A).

Note that before the oxide semiconductor film 530 is formed by a sputtering method, powder substances (also referred to as particles or dust) attached on a surface of the gate insulating layer 507 are preferably removed by reverse sputtering in which an argon gas is introduced and plasma is generated. The reverse sputtering refers to a method in which, without application of a voltage to a target side, an RF power source is used for application of a voltage to a substrate side in an argon atmosphere to generate plasma in the vicinity of the substrate to modify a surface. Note that instead of an argon atmosphere, a nitrogen atmosphere, a helium atmosphere, an oxygen atmosphere, or the like may be used.

As an oxide semiconductor used for the oxide semiconductor film 530, an oxide semiconductor described in Embodiment 2, such as an oxide of four metal elements, an oxide of three metal elements, an oxide of two metal elements, an In—O-based oxide semiconductor, a Sn—O-based oxide semiconductor, or a Zn—O-based oxide semiconductor can be used. Further, $SiO_2$ may be contained in the above oxide semiconductor. In this embodiment, the oxide semiconductor film 530 is formed by a sputtering method with an In—Ga—Zn—O-based metal oxide target. A cross-sectional view of this stage corresponds to FIG. 8A. Alternatively, the oxide semiconductor film 530 may be formed by a sputtering method in a rare gas (typically, argon) atmosphere, an oxygen atmosphere, or a mixed atmosphere of a rare gas and oxygen.

As a target for forming the oxide semiconductor film 530 by a sputtering method, for example, a target with the following composition ratio can be used: the composition ratio of $In_2O_3:Ga_2O_3:ZnO$ is 1:1:1 [molar ratio] (i.e., In:Ga:Zn=1:1:0.5 [atomic ratio]). Alternatively, a target with the following composition ratio may be used: the composition ratio of In:Ga:Zn is 1:1:1 [atomic ratio] or 1:1:2 [atomic ratio]. The fill rate of the metal oxide target is 90% to 100% inclusive, preferably, 95% to 99.9% inclusive. With the use of the metal oxide target with high fill rate, a dense oxide semiconductor film is formed.

It is preferable that a high-purity gas in which impurities such as hydrogen, water, a hydroxyl group, and hydride are removed be used as the sputtering gas for the formation of the oxide semiconductor film 530.

The substrate is placed in a deposition chamber kept under reduced pressure, and the substrate temperature is set to 100° C. to 600° C. inclusive, preferably 200° C. to 400° C. inclusive. Deposition is performed while the substrate is heated, whereby the concentration of an impurity contained in the oxide semiconductor layer formed can be reduced. In addition, damage due to the sputtering can be reduced. Then, a sputtering gas from which hydrogen and moisture are removed is introduced into the deposition chamber from which remaining moisture is being removed, and the oxide semiconductor film 530 is formed over the substrate 505 with the use of the target. To remove moisture remaining in the deposition chamber, an entrapment vacuum pump such as a cryopump, an ion pump, or a titanium sublimation pump is preferably used. Further, an evacuation means may be a turbo pump provided with a cold trap. In the deposition chamber which is evacuated with the cryopump, a hydrogen atom, a compound containing a hydrogen atom, such as water ($H_2O$), (more preferably, also a compound containing a carbon atom), and the like are removed, whereby the concentration of an impurity in the oxide semiconductor film formed in the deposition chamber can be reduced.

An example of the deposition condition is as follows: the distance between the substrate and the target is 100 mm, the pressure is 0.6 Pa, the direct-current (DC) power is 0.5 kW, and the atmosphere is an oxygen atmosphere (the flow rate of the oxygen is 100%). Note that a pulse direct current power source is preferable because powder substances (also referred to as particles or dust) generated in deposition can be reduced and the film thickness can be uniform.

Next, the oxide semiconductor film 530 is processed into an island-shaped oxide semiconductor layer through a second photolithography process. A resist mask for forming the island-shaped oxide semiconductor layer may be formed by an inkjet method. Formation of the resist mask by an inkjet method needs no photomask; thus, the manufacturing cost can be reduced.

In the case where a contact hole is formed in the gate insulating layer 507, a step of forming the contact hole can be performed at the same time as processing of the oxide semiconductor film 530.

For the etching of the oxide semiconductor film 530, one of or both wet etching and dry etching may be employed. As an etchant used for wet etching of the oxide semiconductor film 530, for example, a mixed solution of phosphoric acid, acetic acid, and nitric acid, or an ammonium hydroxide-hydrogen peroxide mixture (a 31 wt % hydrogen peroxide solution: 28 wt % ammonia water: water=5:2:2) can be used. In addition, ITO07N (produced by Kanto Chemical Co., Inc.) may also be used.

Next, first heat treatment is performed on the oxide semiconductor layer. The oxide semiconductor layer can be dehydrated or dehydrogenated through this first heat treatment. The temperature of the first heat treatment is 400° C. to 750° C. inclusive or higher than or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then, the oxide semiconductor layer is not exposed to the air so that entry of water and hydrogen into the oxide semiconductor layer is prevented; thus, an oxide semiconductor layer 531 is obtained (see FIG. 8B).

Note that a heat treatment apparatus is not limited to an electric furnace, and may include a device for heating an object to be processed by heat conduction or heat radiation from a heating element such as a resistance heating element. For example, a rapid thermal anneal (RTA) apparatus such as a gas rapid thermal anneal (GRTA) apparatus or a lamp rapid thermal anneal (LRTA) apparatus can be used. An LRTA apparatus is an apparatus for heating an object to be processed by radiation of light (electromagnetic waves) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high temperature gas. As the high temperature gas, an inert gas which does not react with an object to be processed in heat treatment, such as nitrogen or a rare gas like argon, is used.

For example, as the first heat treatment, GRTA in which the substrate is moved into an inert gas heated to a high temperature as high as 650° C. to 700° C., heated for several minutes, and moved out of the inert gas heated to the high temperature may be performed.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into the heat treatment apparatus be set to 6N (99.9999%) or higher, preferably 7N (99.99999%) or higher (that is, the impurity concentration is 1 ppm or lower, preferably 0.1 ppm or lower).

Further, after the oxide semiconductor layer is heated in the first heat treatment, a high-purity oxygen gas, a high-purity $N_2O$ gas, or ultra-dry air (having a dew point −40° C. or lower, preferably −60° C. or lower) may be introduced in the same furnace. It is preferable that water, hydrogen, and the like be not contained in an oxygen gas or an $N_2O$ gas. The purity of the oxygen gas or the $N_2O$ gas which is introduced into the heat treatment apparatus is preferably 6N or higher, more preferably 7N or higher (i.e., the concentration of impurities in the oxygen gas or the $N_2O$ gas is preferably 1 ppm or lower, more preferably 0.1 ppm or lower). By the action of the oxygen gas or the $N_2O$ gas, oxygen which is a main component contained in the oxide semiconductor and which has been reduced at the same time as the step of removing impurities by dehydration or dehydrogenation is supplied, so that the oxide semiconductor layer can be a highly-purified and electrically i-type (intrinsic) oxide semiconductor.

The first heat treatment of the oxide semiconductor layer may be performed on the oxide semiconductor film 530 which has not yet been processed into the island-shaped oxide semiconductor layer. In that case, the substrate is taken out of the heat apparatus after the first heat treatment, and then a photolithography process is performed.

Note that the first heat treatment may be performed at any of the following timings instead of the above timing as long as it is after deposition of the oxide semiconductor layer: after a source electrode layer and a drain electrode layer are formed over the oxide semiconductor layer; and after an insulating layer is formed over the source electrode layer and the drain electrode layer.

Further, the step of forming the contact hole in the gate insulating layer 507 may be performed either before or after the first heat treatment is performed on the semiconductor film 530.

Further, as the oxide semiconductor layer, an oxide semiconductor layer having a crystal region (single crystal region) with a large thickness, namely, a crystal region whose c-axes are aligned perpendicularly to a surface of the film may be formed by performing deposition twice and performing heat treatment twice, regardless of a material of a base component used, such as oxide, nitride, or metal. For example, a first oxide semiconductor film with a thickness of 3 nm to 15 nm inclusive is formed, and first heat treatment is performed in nitrogen, oxygen, a rare gas, or a dry air atmosphere at a temperature of 450° C. to 850° C. inclusive, preferably 550° C. to 750° C. inclusive, so that a first oxide semiconductor film having a crystal region (including a plate-like crystal) in a region including a surface is formed. Then, a second oxide semiconductor film which has a larger thickness than the first oxide semiconductor film is formed, and second heat treatment is performed at a temperature of 450° C. to 850° C. inclusive, preferably 600° C. to 700° C. inclusive, so that crystal growth proceeds upward with the use of the first oxide semiconductor film as a seed of the crystal growth and thus the whole second oxide semiconductor film is crystallized. In such a manner, the oxide semiconductor layer having a crystal region with a large thickness may be formed.

Next, a conductive film serving as the source and drain electrode layers (including a wiring formed in the same layer as the source and drain electrode layers) is formed over the gate insulating layer 507 and the oxide semiconductor layer 531. For the conductive film serving as the source and drain electrode layers, the material used for the source electrode layer 405a and the drain electrode layer 405b which is described in Embodiment 2 can be used.

Through a third photolithography process, a resist mask is formed over the conductive film and etching is performed selectively, so that the source electrode layer 515a and the drain electrode layer 515b are formed. After that, the resist mask is removed (see FIG. 8C).

Light exposure at the time of the formation of the resist mask in the third photolithography process may be performed using ultraviolet light, a KrF laser beam, or an ArF laser beam. The channel length L of a transistor that is completed later is determined by a distance between bottom edges of the source electrode layer and the drain electrode layer, which are adjacent to each other over the oxide semiconductor layer 531. In the case where light exposure is performed for a channel length L of less than 25 nm, the light exposure at the time of the formation of the resist mask in the third photolithography process may be performed using extreme ultraviolet light having an extremely short wavelength of several nanometers to several tens of nanometers. Light exposure with extreme ultraviolet light leads to a high resolution and a large depth of focus. Thus, the channel length L of the transistor that is completed later can be 10 nm to 1000 nm inclusive and the operation speed of a circuit can be increased.

In order to reduce the number of photomasks used in a photolithography process and reduce the number of photolithography processes, an etching step may be performed with the use of a multi-tone mask which is a light-exposure mask through which light is transmitted to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two or more kinds of different patterns can be formed with one multi-tone mask. Thus, the number of light-exposure masks can be reduced and the number of corresponding photolithography processes can be also reduced, whereby simplification of a process can be realized.

Note that it is desirable that etching conditions be optimized so that the oxide semiconductor layer 531 be not etched and divided when the conductive film is etched. However, it is difficult to obtain etching conditions in which only the conductive film is etched and the oxide semiconductor layer 531 is not etched at all. In some cases, only part of the oxide semiconductor layer 531 is etched to be an oxide semiconductor layer having a groove portion (a recessed portion) when the conductive film is etched.

In this embodiment, since the Ti film is used as the conductive film and the In—Ga—Zn—O-based oxide semiconductor is used as the oxide semiconductor layer 531, an ammonium hydroxide-hydrogen peroxide mixture (a 31 wt % hydrogen peroxide solution: 28 wt % ammonia water: water=5:2:2) is used as an etchant.

Next, through plasma treatment using a gas such as $N_2O$, $N_2$, or Ar, water or the like adsorbed to a surface of an exposed portion of the oxide semiconductor layer may be removed. In the case where the plasma treatment is performed, the insulating layer 516 is formed without exposure to the air as a protective insulating film in contact with part of the oxide semiconductor layer.

The insulating layer 516 can be formed to a thickness of at least 1 nm by a method by which an impurity such as water or hydrogen does not enter the insulating layer 516, such as a sputtering method, as appropriate. When hydrogen is contained in the insulating layer 516, entry of the hydrogen into the oxide semiconductor layer, or extraction of oxygen in the oxide semiconductor layer by hydrogen may occur, thereby causing the backchannel of the oxide semiconductor layer to have lower resistance (to be n-type), so that a parasitic channel may be formed. Therefore, it is important that a deposition method in which hydrogen is not used is employed in order to form the insulating layer 516 containing as little hydrogen as possible.

In this embodiment, a silicon oxide film is formed to a thickness of 200 nm as the insulating layer 516 by a sputtering method. The substrate temperature in deposition may be higher than or equal to room temperature and lower than or equal to 300° C. and is 100° C. in this embodiment. The silicon oxide film can be formed by a sputtering method in a rare gas (typically, argon) atmosphere, an oxygen atmosphere, or a mixed atmosphere containing a rare gas and oxygen. As a target, a silicon oxide target or a silicon target may be used. For example, the silicon oxide film can be formed using a silicon target by a sputtering method in an atmosphere containing oxygen. As the insulating layer 516 which is formed in contact with the oxide semiconductor layer, an inorganic insulating film which does not contain impurities such as moisture, a hydrogen ion, and OH and blocks entry of these from the outside is used. Typically, a silicon oxide film, a silicon oxynitride film, an aluminum oxide film, an aluminum oxynitride film, or the like is used.

In order to remove moisture remaining in the deposition chamber of the insulating layer 516 as in the case of the formation of the oxide semiconductor film 530, an entrapment vacuum pump (such as a cryopump) is preferably used. When the insulating layer 516 is formed in the deposition chamber evacuated using a cryopump, the impurity concentration of the insulating layer 516 can be reduced. In addition, as an evacuation means for removing the moisture remaining in the deposition chamber of the insulating layer 516, a turbo pump provided with a cold trap may be used.

It is preferable that a high-purity gas from which impurities such as hydrogen, water, a hydroxyl group, and hydride are removed be used as the sputtering gas for the formation of the insulating layer 516.

Next, second heat treatment is performed in an inert gas atmosphere or an oxygen gas atmosphere (preferably at a temperature of 200° C. to 400° C. inclusive, for example, 250° C. to 350° C. inclusive). For example, the second heat treatment is performed in a nitrogen atmosphere at 250° C. for one hour. In the second heat treatment, part of the oxide semiconductor layer (a channel formation region) is heated while being in contact with the insulating layer 516.

Through the above steps, the first heat treatment is performed on the oxide semiconductor film so that impurities such as hydrogen, moisture, a hydroxyl group, and hydride (also referred to as a hydrogen compound) are intentionally removed from the oxide semiconductor layer. Additionally, oxygen which is one of main components of an oxide semiconductor and is simultaneously reduced in the step of removing impurities can be supplied. Accordingly, the oxide semiconductor layer is made to be a highly purified and electrically i-type (intrinsic) oxide semiconductor.

Figure 8D:
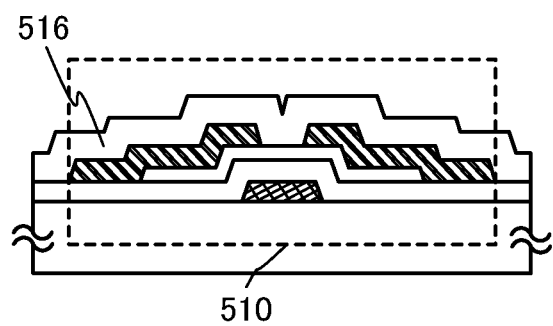
Figure 8E:
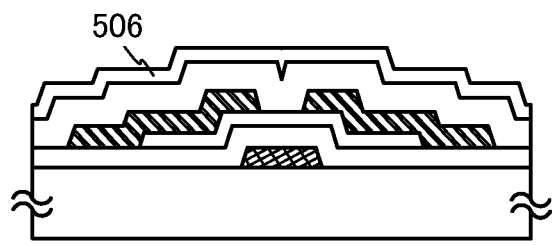

Through the above process, the transistor 510 is formed (FIG. 8D).

When a silicon oxide layer having a lot of defects is used as the oxide insulating layer 516, heat treatment performed after formation of the silicon oxide layer has an effect in diffusing an impurity such as hydrogen, moisture, a hydroxyl group, or hydride contained in the oxide semiconductor layer to the oxide insulating layer so that the impurity contained in the oxide semiconductor layer can be further reduced.

A protective insulating layer 506 may be formed over the insulating layer 516. For example, a silicon nitride film is formed by an RF sputtering method. Since high productivity can be achieved with an RF sputtering method, an RF sputtering method is preferably employed as a formation method of the protective insulating layer. As the protective insulating layer, an inorganic insulating film which does not contain an impurity such as moisture and prevents entry of an impurity from the outside, such as a silicon nitride film or an aluminum nitride film, is used. In this embodiment, a protective insulating layer is formed using a silicon nitride film as the protective insulating layer 506 (see FIG. 8E).

In this embodiment, as the protective insulating layer 506, a silicon nitride film is formed with the use of a target of a silicon semiconductor by heating the substrate 505 over which layers up to and including the insulating layer 516 are formed, to a temperature of 100° C. to 400° C., introducing a sputtering gas containing high-purity nitrogen from which hydrogen and moisture are removed. In that case, the protective insulating layer 506 is preferably formed while removing moisture remaining in the deposition chamber, similarly to the insulating layer 516.

After the formation of the protective insulating layer, heat treatment may be further performed at a temperature of 100° C. to 200° C. inclusive in the air for an hour to 30 hours inclusive. This heat treatment may be performed at a fixed heating temperature. Alternatively, the following change in the heating temperature may be conducted plural times repeatedly: the heating temperature is increased from a room temperature to a temperature of 100° C. to 200° C. inclusive and then decreased to a room temperature.

In this manner, with the use of the transistor including a highly-purified oxide semiconductor layer formed according to this embodiment, the value of current in an off state (off-state current value) can be further reduced. Accordingly, an electric signal such as an image signal can be held for a longer time and a writing interval can be set longer. Therefore, the frequency of refresh operation can be reduced, which leads to a more excellent effect of suppressing power consumption.

Moreover, a period during which a still image can be displayed while the power supply is off can be longer, resulting in improvement in convenience.

Further, in the transistor including the highly-purified oxide semiconductor layer, high field-effect mobility can be obtained, whereby high-speed operation is possible. Therefore, by using the transistor in a pixel portion of a display device, color separation can be suppressed and a high-quality image can be provided. Since the transistors in a circuit portion and the pixel portion can be separately formed over one substrate, the number of components of the display device can be reduced.

This embodiment can be implemented in appropriate combination with any of the structures described in the other embodiments.

(Embodiment 4)

A display device disclosed in this specification can be applied to a variety of electronic devices (including game machines). Examples of electronic devices are a television device (also referred to as a television or a television set), a monitor of a computer or the like, a camera such as a digital camera or a digital video camera, a digital photo frame, a mobile phone (also referred to as a mobile phone handset or a mobile phone device), a portable game console, a portable information terminal, an audio reproducing device, a large-sized game machine such as a pachinko machine, and the like. Examples of electronic devices each including the display device described in any of the above embodiments will be described.

Figure 9A:
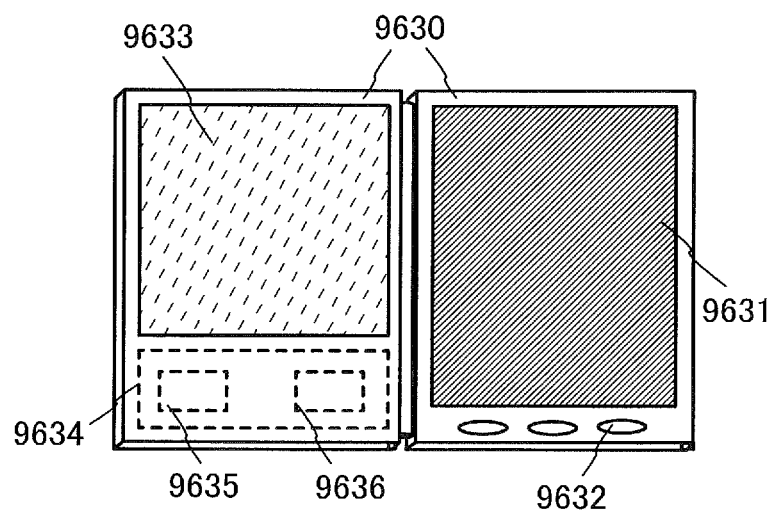
FIGS. 9A and 9B illustrate an electronic device.

FIG. 9A illustrates an electronic book (also referred to as an eBook or an e-book reader) that can include a housing 9630, a display portion 9631, operation keys 9632, a solar cell 9633, and a charge and discharge control circuit 9634. The electronic book in FIG. 9A can have a function of displaying a variety of kinds of data (e.g., a still image, a moving image, and a text image) on the display portion; a function of displaying a calendar, a date, the time, and the like on the display portion; a function of operating or editing the data displayed on the display portion; a function of controlling processing with the use of various kinds of software (programs); and the like. FIG. 9A illustrates the charge and discharge control circuit 9634 including a battery 9635, and a DC-DC converter (hereinafter abbreviated to a converter) 9636, as an example. By applying the display device according to any one of Embodiments 1 to 3 to the display portion 9631, the electronic book can have a higher level of convenience and a higher level of security and consumes a smaller amount of power.

In the case of employing the structure illustrated in FIG. 9A and using a transflective or reflective liquid crystal display device as the display portion 9631, the transflective or reflective liquid crystal display device is expected to be used when ambient light is relatively bright, and power generation by the solar cell 9633 and charge of the battery 9635 are efficiently performed, which is favorable. The solar cell 9633 can be appropriately provided in an unoccupied space (a front surface and a back surface) of the housing 9630 and charge of the battery 9635 are efficiently performed, which is favorable. Note that it is advantageous to use a lithium ion battery as the battery 9635 because reduction in size can be achieved, for example.

Figure 9B:
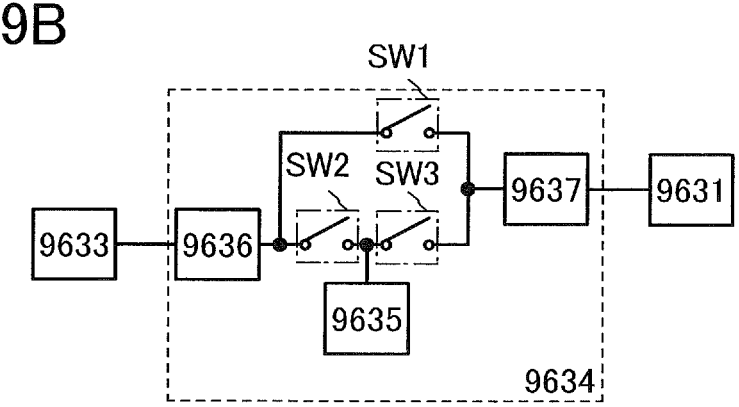

The structure and operation of the charge and discharge control circuit 9634 illustrated in FIG. 9A will be described with reference to a block diagram in FIG. 9B. FIG. 9B illustrates the solar cell 9633, the battery 9635, the converter 9636, a converter 9637, switches SW1 to SW3, and the display portion 9631. The battery 9635, the converter 9636, the converter 9637, and switches SW1 to SW3 correspond to the charge and discharge control circuit 9634.

First, an example of operation in the case where power is generated by the solar cell 9633 using external light will be described. The voltage of power generated by the solar cell is raised or lowered by the converter 9636 so as to be a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and the switch SW2 is turned on so that the battery 9635 may be charged.

Next, operation in the case where power is not generated by the solar cell 9633 using external light will be described. The voltage of power accumulated in the battery 9635 is raised or lowered by the converter 9637 by turning on the switch SW3. Then, power from the battery 9635 is used for the operation of the display portion 9631.

Note that although the solar cell 9633 is described as an example of a means for charge, the battery 9635 may be charged with another means. In addition, a combination of the solar cell 9633 and another means for charge may be used.

Figure 10A:
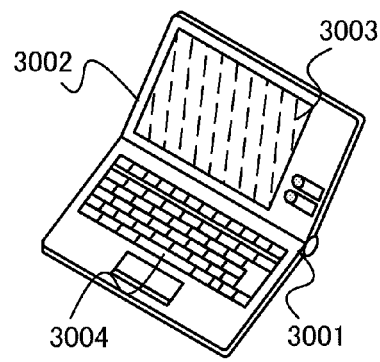
FIGS. 10A to 10F each illustrate an electronic device.

FIG. 10A is a notebook style personal computer which includes a housing 3001, a housing 3002, a display portion 3003, a keyboard 3004, and the like. By applying the display device according to any one of Embodiments 1 to 3 to the display portion 3003, the notebook style personal computer can have a higher level of convenience and a higher level of security and consumes a smaller amount of power.

Figure 10B:
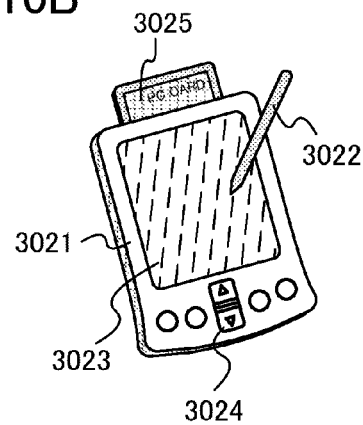

FIG. 10B is a personal digital assistant (PDA) which is provided with a housing 3021, a display portion 3023, an external interface 3025, operation buttons 3024, and the like. Additionally, there is a stylus 3022 as an operation accessory. By applying the display device according to any one of Embodiments 1 to 3 to the display portion 3023, the personal digital assistant (PDA) can have a higher level of convenience and a higher level of security and consumes a smaller amount of power.

Figure 10C:
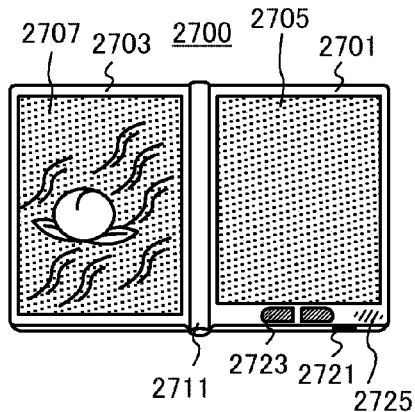

FIG. 10C illustrates an e-book reader 2700. For example, the e-book reader 2700 includes two housings, a housing 2701 and a housing 2703. The housings 2701 and 2703 are attached by a hinge 2711 so that the e-book reader 2700 can be opened and closed along the hinge 2711. With such a structure, the e-book reader 2700 can be handled like a paper book.

A display portion 2705 is incorporated in the housing 2701, and a display portion 2707 is incorporated in the housing 2703. The display portion 2705 and the display portion 2707 may display one image or different images. In the case where the display portion 2705 and the display portion 2707 display different images, for example, a display portion on the right side (the display portion 2705 in FIG. 10C) can display text and a display portion on the left side (the display portion 2707 in FIG. 10C) can display graphics. By applying the display device according to any one of Embodiments 1 to 3 to the display portion 2705, the e-book reader 2700 can have a higher level of convenience and a higher level of security and consumes a smaller amount of power.

FIG. 10C illustrates an example in which the housing 2701 is provided with an operation portion and the like. For example, the housing 2701 includes a power source 2721, operation keys 2723, a speaker 2725, and the like. Pages can be turned with the operation keys 2723. Note that a keyboard, a pointing device, or the like may also be provided on the surface of the housing on which the display portion is provided. Furthermore, an external connection terminal (an earphone terminal, a USB terminal, or the like), a recording medium insertion portion, and the like may be provided on the back surface or a side surface of the housing. Additionally, the e-book reader 2700 may have a function of an electronic dictionary.

Further, the e-book reader 2700 may send and receive data wirelessly. Through wireless communication, desired book data or the like can be purchased and downloaded from an electronic book server.

Figure 10D:
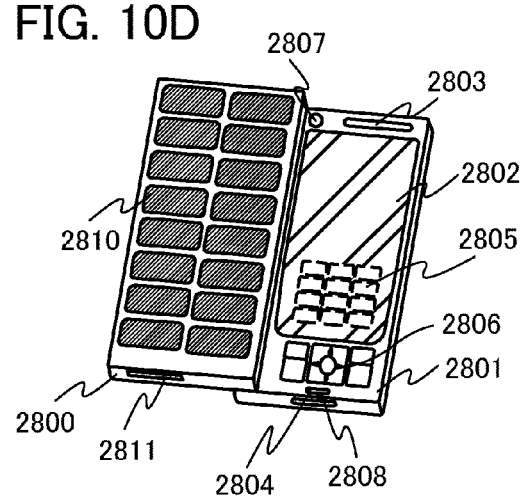

FIG. 10D is a cellular phone including two housings, a housing 2800 and a housing 2801. The housing 2801 includes a display panel 2802, a speaker 2803, a microphone 2804, a pointing device 2806, a camera lens 2807, an external connection terminal 2808, and the like. Further, the housing 2800 includes a solar battery cell 2810 which charges the cellular phone, an external memory slot 2811, and the like. In addition, an antenna is incorporated in the housing 2801. By applying the display device according to any one of Embodiments 1 to 3 to the display panel 2802, the cellular phone can have a higher level of convenience and a higher level of security and consumes a smaller amount of power.

Further, the display panel 2802 is provided with a touch panel, and as illustrated by dashed lines in FIG. 10D, a plurality of operation keys 2805 are displayed as an image. Note that the cellular phone is mounted with also a boosting circuit for boosting an output voltage of the solar battery cell 2810 into the necessary voltage for each circuit.

In the display panel 2802, a display orientation can be appropriately changed according to a usage pattern. Further, since the camera lens 2807 is provided on the same surface as the display panel 2802, the cellular phone can be used as a video phone. The speaker 2803 and the microphone 2804 can be used not only for voice calls, but also for video phone calls, recording, playing sound, and the like. Moreover, the housings 2800 and 2801 developed as illustrated in FIG. 10D can be slid so that one overlaps the other; therefore, the size of the cellular phone can be reduced, which makes the cellular phone suitable for being carried.

The external connection terminal 2808 can be connected to any of various cables such as an AC adapter and a USB cable, whereby the cellular phone can be charged or can perform data communication with a personal computer or the like. Moreover, by inserting a recording medium into the external memory slot 2811, the cellular phone can handle the storage and transfer of a large amount of data.

Further, in addition to the above functions, an infrared communication function, a television reception function, or the like may be provided.

Figure 10E:
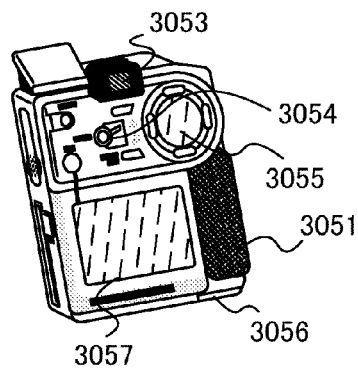

FIG. 10E is a digital video camera including a main body 3051, a display portion A 3057, an eye piece portion 3053, an operation switch 3054, a display portion B 3055, a battery 3056, and the like. By applying the display device according to any one of Embodiments 1 to 3 to each of the display portion A 3057 and the display portion B 3055, the digital video camera can have a higher level of convenience and a higher level of security and consumes a smaller amount of power.

Figure 10F:
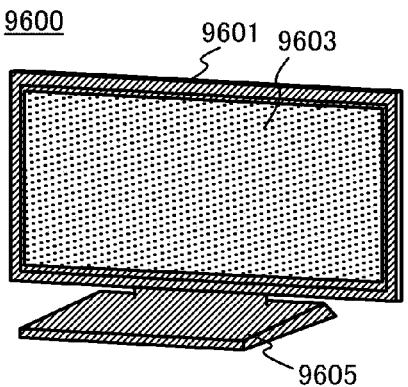

FIG. 10F illustrates a television set 9600. The television set 9600 has a display portion 9603 incorporated in a housing 9601. Images can be displayed on the display portion 9603. Note that here, the housing 9601 is supported by a stand 9605. By applying the display device according to any one of Embodiments 1 to 3 to the display portion 9603, the television set 9600 can have a higher level of convenience and a higher level of security and consumes a smaller amount of power.

The television set 9600 can be operated by an operation switch of the housing 9601 or a separate remote controller. Moreover, the remote controller may have a display portion in which the information output from the remote controller is displayed.

Note that the television set 9600 is provided with a receiver, a modem, and the like. With the use of the receiver, general television broadcasting can be received. Additionally, when the display device is connected to a communication network with or without wires via the modem, one-way (from a sender to a receiver) or two-way (between a sender and a receiver or between receivers) data communication can also be performed.

This embodiment can be implemented in appropriate combination with any of the structures described in the other embodiments.

This application is based on Japanese Patent Application serial no. 2010-010321 filed with Japan Patent Office on Jan. 20, 2010, the entire contents of which are hereby incorporated by reference.

The invention claimed is:

1. A display device comprising:
a pixel portion comprising a pixel electrode and a common electrode,
wherein the display device is configured to select a moving image display mode and a still image display mode,
wherein a first image signal is supplied to the pixel electrode and a common potential is supplied to the common electrode in the moving image display mode,
wherein a second image signal is supplied to the pixel electrode and the common potential is supplied to the common electrode in a first frame period in the still image display mode,
wherein each of the pixel electrode and the common electrode is in a floating state in a second frame period after the first frame period in the still image display mode,
wherein the pixel portion is configured to display a still image after supplying the second image signal, and
wherein the display device is put to an off state with the still image displayed in the pixel portion.

2. The display device according to claim 1, further comprising a driver circuit electrically connected to the pixel portion, wherein a control signal is not supplied to the driver circuit when each of the pixel electrode and the common electrode is in the floating state.

3. The display device according to claim 1, wherein a number of times of writing image data in the still image display mode is smaller than a number of times of writing image data in the moving image display mode.

4. The display device according to claim 1, further comprising a transistor electrically connected to the pixel electrode, wherein the transistor comprises an oxide semiconductor comprising a channel formation region.

5. The display device according to claim 4, wherein the oxide semiconductor comprises indium and zinc.

6. The display device according to claim 1, further comprising a first transistor electrically connected to the pixel electrode and a second transistor electrically connected to the common electrode, wherein each of the first transistor and the second transistor comprises an oxide semiconductor comprising a channel formation region.

7. The display device according to claim 1, further comprising a comparator circuit configured to determine whether a mode of driving the display device is the moving image display mode or the still image display mode.

8. A display device comprising:
a pixel portion comprising a pixel electrode, a common electrode and a liquid crystal layer between the pixel electrode and the common electrode,
wherein the display device is configured to select a moving image display mode and a still image display mode,
wherein a first image signal is supplied to the pixel electrode and a common potential is supplied to the common electrode in the moving image display mode,
wherein a second image signal is supplied to the pixel electrode and the common potential is supplied to the common electrode in a first frame period in the still image display mode,
wherein each of the pixel electrode and the common electrode is in a floating state in a second frame period after the first frame period in the still image display mode,
wherein the pixel portion is configured to display a still image after supplying the second image signal, and
wherein the display device is put to an off state with the still image displayed in the pixel portion.

9. The display device according to claim 8, further comprising a driver circuit electrically connected to the pixel portion, wherein a control signal is not supplied to the driver circuit when each of the pixel electrode and the common electrode is in the floating state.

10. The display device according to claim 8, wherein a number of times of writing image data in the still image display mode is smaller than a number of times of writing image data in the moving image display mode.

11. The display device according to claim 8, further comprising a transistor electrically connected to the pixel electrode, wherein the transistor comprises an oxide semiconductor comprising a channel formation region.

12. The display device according to claim 11, wherein the oxide semiconductor comprises indium and zinc.

13. The display device according to claim 8, further comprising a first transistor electrically connected to the pixel electrode and a second transistor electrically connected to the common electrode, wherein each of the first transistor and the second transistor comprises an oxide semiconductor comprising a channel formation region.

14. The display device according to claim 8, further comprising a comparator circuit configured to determine whether a mode of driving the display device is the moving image display mode or the still image display mode.

* * * * *